United States Patent
Howard et al.

(10) Patent No.: US 8,923,785 B2
(45) Date of Patent: *Dec. 30, 2014

(54) CONTINUOUS BEAMFORMING FOR A MIMO-OFDM SYSTEM

(75) Inventors: Steven J. Howard, Ashland, MA (US); Jay Rodney Walton, Carlisle, MA (US); Mark S. Wallace, Bedford, MA (US)

(73) Assignee: QUALCOMM Incorporated, San Diego, CA (US)

(*) Notice: Subject to any disclaimer, the term of this patent is extended or adjusted under 35 U.S.C. 154(b) by 1665 days.

This patent is subject to a terminal disclaimer.

(21) Appl. No.: 11/050,897

(22) Filed: Feb. 3, 2005

(65) Prior Publication Data

US 2005/0265275 A1 Dec. 1, 2005

Related U.S. Application Data

(60) Provisional application No. 60/578,656, filed on Jun. 9, 2004, provisional application No. 60/576,719, filed on Jun. 2, 2004, provisional application No. 60/569,103, filed on May 7, 2004.

(51) Int. Cl.
*H04B 7/02* (2006.01)
*H04B 7/06* (2006.01)
*H04B 7/04* (2006.01)

(52) U.S. Cl.
CPC ............ *H04B 7/0617* (2013.01); *H04B 7/0417* (2013.01); *H04B 7/0626* (2013.01); *H04B 7/0671* (2013.01); *H04B 7/0408* (2013.01)
USPC ......... 455/103; 455/101; 455/562.1; 375/267

(58) Field of Classification Search
USPC .......... 370/343, 334, 208, 210; 375/267, 299, 375/260; 455/562.1, 101, 273, 275, 276.1
See application file for complete search history.

(56) References Cited

U.S. PATENT DOCUMENTS 5,581,583 A 12/1996 Conti et al.
5,668,837 A 9/1997 Dent (Continued)

FOREIGN PATENT DOCUMENTS

CA 2490520 A1 12/2003
CA 2510840 A1 7/2004

(Continued)

OTHER PUBLICATIONS

Dammann et al., "Beamforming in Combination with Space-Time Diversity for Broadband OFDM Systems," IEEE International Conference on Communications, XP010589479 (2002).

(Continued)

*Primary Examiner* — Philip Sobutka
(74) *Attorney, Agent, or Firm* — Kenyon S. Jenckes

(57) ABSTRACT

A transmitting entity performs spatial processing on data symbols for each subband with an eigenmode matrix, a steering matrix, or an identity matrix to obtain spatially processed symbols for the subband. The data symbols may be sent on orthogonal spatial channels with the eigenmode matrix, on different spatial channels with the steering matrix, or from different transmit antennas with the identity matrix. The transmitting entity further performs beamforming on the spatially processed symbols, in the frequency domain or time domain, prior to transmission from the multiple transmit antennas. A receiving entity performs the complementary processing to recover the data symbols sent by the transmitting entity. The receiving entity may derive a spatial filter matrix for each subband based on a MIMO channel response matrix for that subband and perform receiver spatial processing for the subband with the spatial filter matrix.

72 Claims, 11 Drawing Sheets

(56) References Cited

U.S. PATENT DOCUMENTS

| | | | |
|---|---|---|---|
| 5,757,845 A | 5/1998 | Fukawa et al. | |
| 6,061,023 A | 5/2000 | Daniel et al. | |
| 6,118,758 A | 9/2000 | Marchok et al. | |
| 6,144,711 A | 11/2000 | Raleigh et al. | |
| 6,175,743 B1 | 1/2001 | Alperovich et al. | |
| 6,198,775 B1 | 3/2001 | Khayrallah et al. | |
| 6,218,985 B1 | 4/2001 | Adams | |
| 6,298,035 B1 | 10/2001 | Heiskala | |
| 6,314,147 B1 | 11/2001 | Liang et al. | |
| 6,351,499 B1 | 2/2002 | Paulraj et al. | |
| 6,441,786 B1 | 8/2002 | Jasper et al. | |
| 6,452,981 B1 | 9/2002 | Raleigh et al. | |
| 6,473,467 B1 | 10/2002 | Wallace et al. | |
| 6,477,161 B1 | 11/2002 | Hudson et al. | |
| 6,486,828 B1 | 11/2002 | Cahn et al. | |
| 6,496,535 B2 | 12/2002 | Xu | |
| 6,542,556 B1 | 4/2003 | Kuchi et al. | |
| 6,545,997 B1 | 4/2003 | Boehnke et al. | |
| 6,618,454 B1 | 9/2003 | Agrawal et al. | |
| 6,642,888 B2 | 11/2003 | Kishigami et al. | |
| 6,678,263 B1 | 1/2004 | Hammons, Jr. et al. | |
| 6,711,124 B2 | 3/2004 | Khayrallah et al. | |
| 6,711,528 B2 | 3/2004 | Dishman et al. | |
| 6,760,388 B2 | 7/2004 | Ketchum et al. | |
| 6,763,073 B2 | 7/2004 | Foschini et al. | |
| 6,788,661 B1 | 9/2004 | Ylitalo et al. | |
| 6,801,790 B2 | 10/2004 | Rudrapatna | |
| 6,804,307 B1 | 10/2004 | Popovic | |
| 6,810,506 B1 | 10/2004 | Levy | |
| 6,816,555 B2 | 11/2004 | Sakoda | |
| 6,842,487 B1 | 1/2005 | Larsson | |
| 6,847,306 B2 | 1/2005 | Diba et al. | |
| 6,859,747 B2 | 2/2005 | Yutkowitz | |
| 6,862,271 B2 | 3/2005 | Medvedev et al. | |
| 6,873,606 B2 | 3/2005 | Agrawal et al. | |
| 6,888,789 B1 | 5/2005 | Sakoda et al. | |
| 6,937,189 B2 | 8/2005 | Kim | |
| 6,940,917 B2 * | 9/2005 | Menon et al. | 375/267 |
| 6,956,897 B1 | 10/2005 | Honig | |
| 6,975,668 B2 | 12/2005 | Zhang | |
| 6,982,946 B2 | 1/2006 | Wiberg et al. | |
| 6,999,472 B2 | 2/2006 | Hamalainen et al. | |
| 7,020,110 B2 | 3/2006 | Walton et al. | |
| 7,020,490 B2 | 3/2006 | Khatri | |
| 7,031,669 B2 | 4/2006 | Vaidyanathan et al. | |
| 7,057,555 B2 | 6/2006 | Lewis | |
| 7,061,969 B2 | 6/2006 | Alamouti et al. | |
| 7,065,144 B2 | 6/2006 | Walton et al. | |
| 7,065,156 B1 | 6/2006 | Kuchi | |
| 7,079,870 B2 | 7/2006 | Vaidyanathan et al. | |
| 7,092,737 B2 | 8/2006 | Horng et al. | |
| 7,095,709 B2 | 8/2006 | Walton et al. | |
| 7,095,987 B2 | 8/2006 | Brothers, Jr. et al. | |
| 7,099,678 B2 | 8/2006 | Vaidyanathan | |
| 7,099,698 B2 | 8/2006 | Tarokh et al. | |
| 7,110,350 B2 | 9/2006 | Li et al. | |
| 7,110,378 B2 | 9/2006 | Onggosanusi et al. | |
| 7,110,463 B2 | 9/2006 | Wallace et al. | |
| 7,116,723 B2 | 10/2006 | Kim et al. | |
| 7,130,580 B2 | 10/2006 | Alexiou et al. | |
| 7,149,254 B2 | 12/2006 | Sampath | |
| 7,151,806 B2 | 12/2006 | Hosoda et al. | |
| 7,158,498 B2 | 1/2007 | Lundby et al. | |
| 7,190,734 B2 | 3/2007 | Giannakis et al. | |
| 7,194,042 B2 | 3/2007 | Walton et al. | |
| 7,200,631 B2 | 4/2007 | Mailaender et al. | |
| 7,206,354 B2 | 4/2007 | Wallace et al. | |
| 7,218,689 B2 | 5/2007 | Gupta | |
| 7,227,906 B2 | 6/2007 | Fukuda et al. | |
| 7,236,478 B2 | 6/2007 | Wu et al. | |
| 7,292,623 B2 | 11/2007 | Reznik | |
| 7,298,805 B2 | 11/2007 | Walton et al. | |
| 7,301,924 B1 | 11/2007 | Gurbuz et al. | |
| 7,302,009 B2 | 11/2007 | Walton et al. | |
| 7,317,750 B2 | 1/2008 | Shattil | |
| 7,324,429 B2 | 1/2008 | Walton et al. | |
| 7,324,482 B2 | 1/2008 | Hammons, Jr. et al. | |
| 7,327,795 B2 | 2/2008 | Oprea | |
| 7,327,798 B2 | 2/2008 | Won | |
| 7,327,800 B2 | 2/2008 | Oprea et al. | |
| 7,336,727 B2 | 2/2008 | Mukkavilli et al. | |
| 7,336,746 B2 | 2/2008 | Walton et al. | |
| 7,356,073 B2 | 4/2008 | Heikkila | |
| 7,359,466 B2 | 4/2008 | Huang et al. | |
| 7,385,617 B2 | 6/2008 | Tahat | |
| 7,394,754 B2 | 7/2008 | Lii et al. | |
| 7,436,896 B2 | 10/2008 | Hottinen et al. | |
| 7,447,268 B2 | 11/2008 | Sadowsky et al. | |
| 7,522,673 B2 | 4/2009 | Giannakis et al. | |
| 7,529,177 B2 | 5/2009 | Celebi et al. | |
| 7,532,563 B1 | 5/2009 | Shirali et al. | |
| 7,539,253 B2 | 5/2009 | Li et al. | |
| 7,555,053 B2 | 6/2009 | Trachewsky et al. | |
| 7,583,747 B1 | 9/2009 | Damen et al. | |
| 7,593,317 B2 | 9/2009 | Yuda et al. | |
| 7,653,142 B2 | 1/2010 | Ketchum et al. | |
| 7,711,762 B2 | 5/2010 | Howard et al. | |
| 7,742,546 B2 | 6/2010 | Ketchum et al. | |
| 7,764,754 B2 | 7/2010 | Walton et al. | |
| 7,787,554 B1 | 8/2010 | Nabar et al. | |
| 7,894,548 B2 | 2/2011 | Walton et al. | |
| 7,895,254 B2 | 2/2011 | Ketchum et al. | |
| 7,899,131 B2 | 3/2011 | Walton et al. | |
| 7,974,359 B2 | 7/2011 | Gorokhov et al. | |
| 7,978,649 B2 | 7/2011 | Howard et al. | |
| 7,978,778 B2 | 7/2011 | Wallace et al. | |
| 7,991,065 B2 | 8/2011 | Wallace et al. | |
| 8,325,844 B2 | 12/2012 | Walton et al. | |
| 2001/0053124 A1 | 12/2001 | Ichihara et al. | |
| 2002/0009125 A1 | 1/2002 | Shi | |
| 2002/0091943 A1 | 7/2002 | Lau | |
| 2002/0102940 A1 | 8/2002 | Bohnke et al. | |
| 2002/0114269 A1 | 8/2002 | Onggosanusi et al. | |
| 2002/0127978 A1 | 9/2002 | Khatri et al. | |
| 2002/0172264 A1 | 11/2002 | Wiberg et al. | |
| 2002/0193146 A1 | 12/2002 | Wallace et al. | |
| 2002/0196742 A1 | 12/2002 | Baker et al. | |
| 2003/0011274 A1 | 1/2003 | Saint-Michel et al. | |
| 2003/0016637 A1 | 1/2003 | Khayrallah et al. | |
| 2003/0026349 A1 | 2/2003 | Onggosanusi et al. | |
| 2003/0072254 A1 | 4/2003 | Ma et al. | |
| 2003/0072382 A1 | 4/2003 | Raleigh et al. | |
| 2003/0076908 A1 | 4/2003 | Huang et al. | |
| 2003/0108117 A1 | 6/2003 | Ketchum et al. | |
| 2003/0112745 A1 | 6/2003 | Zhuang et al. | |
| 2003/0123565 A1 | 7/2003 | Fukuda et al. | |
| 2003/0123567 A1 | 7/2003 | Shigemasa et al. | |
| 2003/0128658 A1 | 7/2003 | Walton et al. | |
| 2003/0161282 A1 | 8/2003 | Medvedev et al. | 370/329 |
| 2003/0161412 A1 | 8/2003 | Niida et al. | |
| 2003/0181211 A1 | 9/2003 | Razavilar et al. | |
| 2003/0186698 A1 | 10/2003 | Holma et al. | |
| 2003/0189999 A1 | 10/2003 | Kadous | |
| 2003/0204380 A1 | 10/2003 | Dishman et al. | |
| 2003/0228850 A1 | 12/2003 | Hwang | |
| 2003/0235147 A1 | 12/2003 | Walton et al. | |
| 2003/0235238 A1 | 12/2003 | Schelm et al. | |
| 2003/0235255 A1 | 12/2003 | Ketchum et al. | |
| 2004/0002364 A1 | 1/2004 | Trikkonen et al. | |
| 2004/0022183 A1 | 2/2004 | Li et al. | |
| 2004/0042439 A1 | 3/2004 | Menon et al. | 370/343 |
| 2004/0052315 A1 | 3/2004 | Thielecke et al. | |
| 2004/0066773 A1 | 4/2004 | Sun et al. | |
| 2004/0081263 A1 | 4/2004 | Lee et al. | |
| 2004/0082356 A1 | 4/2004 | Walton et al. | |
| 2004/0085939 A1 | 5/2004 | Wallace et al. | |
| 2004/0086027 A1 | 5/2004 | Shattil et al. | |
| 2004/0087324 A1 | 5/2004 | Ketchum et al. | 455/513 |
| 2004/0102157 A1 | 5/2004 | Lewis et al. | |
| 2004/0136349 A1 | 7/2004 | Walton et al. | |
| 2004/0139137 A1 | 7/2004 | Mailaender et al. | |
| 2004/0157645 A1 | 8/2004 | Smith et al. | |
| 2004/0165675 A1 | 8/2004 | Ito et al. | |
| 2004/0190639 A1 | 9/2004 | Pauli et al. | |

(56) References Cited

U.S. PATENT DOCUMENTS

| | | |
|---|---|---|
| 2004/0203473 A1 | 10/2004 | Liu |
| 2004/0248604 A1* | 12/2004 | Vaidyanathan ............... 455/517 |
| 2005/0017511 A1 | 1/2005 | Dalton |
| 2005/0026570 A1 | 2/2005 | Han |
| 2005/0094552 A1 | 5/2005 | Abe et al. |
| 2005/0149320 A1 | 7/2005 | Kajala et al. |
| 2005/0175115 A1 | 8/2005 | Walton et al. |
| 2005/0180312 A1 | 8/2005 | Walton et al. |
| 2005/0195733 A1 | 9/2005 | Walton et al. |
| 2005/0220199 A1 | 10/2005 | Sadowsky et al. |
| 2005/0238111 A1 | 10/2005 | Wallace et al. |
| 2005/0249159 A1 | 11/2005 | Abraham et al. |
| 2005/0249174 A1 | 11/2005 | Lundby et al. |
| 2005/0267925 A1 | 12/2005 | Clue |
| 2005/0276347 A1 | 12/2005 | Mujtaba et al. |
| 2006/0013250 A1 | 1/2006 | Howard et al. |
| 2006/0050770 A1 | 3/2006 | Wallace et al. |
| 2006/0067277 A1 | 3/2006 | Thomas et al. |
| 2006/0067421 A1 | 3/2006 | Walton et al. |
| 2006/0068718 A1 | 3/2006 | Li et al. |
| 2006/0106902 A1 | 5/2006 | Howard et al. |
| 2006/0155798 A1 | 7/2006 | Ketchum et al. |
| 2006/0234789 A1 | 10/2006 | Tarokh et al. |
| 2006/0274844 A1 | 12/2006 | Walton et al. |
| 2006/0285531 A1 | 12/2006 | Howard et al. |
| 2007/0009059 A1 | 1/2007 | Wallace et al. |
| 2007/0217538 A1 | 9/2007 | Waxman |
| 2007/0249296 A1 | 10/2007 | Howard et al. |
| 2007/0268181 A1 | 11/2007 | Howard et al. |
| 2008/0031372 A1 | 2/2008 | Walton et al. |
| 2008/0031374 A1 | 2/2008 | Walton et al. |
| 2008/0095121 A1 | 4/2008 | Shattil |
| 2008/0095282 A1 | 4/2008 | Walton et al. |
| 2008/0273617 A1 | 11/2008 | Lundby et al. |
| 2009/0290657 A1 | 11/2009 | Howard et al. |
| 2010/0074301 A1 | 3/2010 | Howard et al. |
| 2010/0169396 A1 | 7/2010 | Howard et al. |
| 2011/0142097 A1 | 6/2011 | Walton et al. |
| 2012/0213181 A1 | 8/2012 | Walton et al. |
| 2012/0250788 A1 | 10/2012 | Walton et al. |
| 2013/0188677 A1 | 7/2013 | Howard et al. |

FOREIGN PATENT DOCUMENTS

| | | |
|---|---|---|
| CN | 1476695 A | 2/2004 |
| CN | 1592144 A | 3/2005 |
| EP | 0091999 A1 | 10/1983 |
| EP | 0752793 A2 | 1/1997 |
| EP | 0905920 A2 | 3/1999 |
| EP | 1009124 A2 | 6/2000 |
| EP | 1073214 | 1/2001 |
| EP | 1185001 | 3/2002 |
| EP | 1220506 | 7/2002 |
| EP | 1223702 A1 | 7/2002 |
| EP | 1241824 | 9/2002 |
| EP | 1353452 A2 | 10/2003 |
| EP | 1361686 A1 | 11/2003 |
| EP | 1396956 | 3/2004 |
| JP | 11163822 A | 6/1999 |
| JP | 11-205026 | 7/1999 |
| JP | 2000068975 | 3/2000 |
| JP | 2001077788 A | 3/2001 |
| JP | 2001237751 A | 8/2001 |
| JP | 2002-503048 | 1/2002 |
| JP | 2002524972 | 8/2002 |
| JP | 2003249914 A | 9/2003 |
| JP | 2003530010 | 10/2003 |
| JP | 200423416 | 1/2004 |
| JP | 2004-064654 | 2/2004 |
| JP | 2004-072150 | 3/2004 |
| JP | 2004-096753 | 3/2004 |
| JP | 2004509556 A | 3/2004 |
| JP | 2004-104790 | 4/2004 |
| JP | 2005027294 A | 1/2005 |
| JP | 2005519567 A | 6/2005 |
| JP | 2005-524331 | 8/2005 |
| JP | 2007504188 A | 3/2007 |
| JP | 2007-515829 | 6/2007 |
| JP | 2007515131 | 6/2007 |
| JP | 2007-523549 | 8/2007 |
| JP | 2007-523550 | 8/2007 |
| JP | 2007527150 | 9/2007 |
| JP | 2007-529972 | 10/2007 |
| JP | 2007-538414 | 12/2007 |
| KR | 200260860 | 7/2002 |
| KR | 20040061023 A | 7/2004 |
| KR | 20040089748 | 10/2004 |
| KR | 20060123496 | 12/2006 |
| RU | 2103768 C1 | 1/1998 |
| RU | 2111619 | 5/1998 |
| RU | 2116698 | 7/1998 |
| RU | 2202152 | 4/2003 |
| RU | 2238611 C1 | 10/2004 |
| RU | 2005115862 | 1/2006 |
| RU | 2292116 | 1/2007 |
| TW | 341680 | 10/1998 |
| TW | 350047 | 1/1999 |
| TW | 466385 B | 12/2001 |
| TW | 508960 | 11/2002 |
| TW | 510103 B | 11/2002 |
| TW | 512602 | 12/2002 |
| TW | 200304287 | 9/2003 |
| TW | 337487 B1 * | 2/2011 |
| WO | WO9737456 A2 | 10/1997 |
| WO | 0014921 A1 | 3/2000 |
| WO | 0044144 A1 | 7/2000 |
| WO | WO0156218 A1 | 2/2001 |
| WO | 0176110 | 10/2001 |
| WO | WO0205506 | 1/2002 |
| WO | 0219565 A2 | 3/2002 |
| WO | 0225857 | 3/2002 |
| WO | 02078211 | 10/2002 |
| WO | WO02093784 A1 | 11/2002 |
| WO | 03015334 | 2/2003 |
| WO | 03041300 | 5/2003 |
| WO | WO03050968 | 6/2003 |
| WO | 03058871 | 7/2003 |
| WO | 03063526 | 7/2003 |
| WO | WO03056742 A1 | 7/2003 |
| WO | WO03071711 | 8/2003 |
| WO | 03077492 A1 | 9/2003 |
| WO | WO03073646 | 9/2003 |
| WO | 03094386 | 11/2003 |
| WO | 2004002011 | 12/2003 |
| WO | 2004002047 | 12/2003 |
| WO | WO03101029 A1 | 12/2003 |
| WO | WO2004021605 A1 | 3/2004 |
| WO | 2004038984 | 5/2004 |
| WO | 2004038985 | 5/2004 |
| WO | WO2004038987 | 5/2004 |
| WO | WO2004039011 A2 | 5/2004 |
| WO | WO2004043082 A2 | 5/2004 |
| WO | WO2004054191 | 6/2004 |
| WO | 2005060298 A1 | 6/2005 |
| WO | WO2005060144 | 6/2005 |
| WO | WO2005060192 | 6/2005 |
| WO | WO2005088882 A1 | 9/2005 |
| WO | 2005099211 | 10/2005 |
| WO | WO2006053340 A2 | 5/2006 |

OTHER PUBLICATIONS

Kaiser, "Spatial Transmit Diversity Techniques for Broadband OFDM Systems," IEEE Global Telecommunications Conference, XP001195742 (2000).

Pan et al., "Dynamic Sub-channel Allocations with Adaptive Beamforming for Broadband OFDM Wireless Systems," IEEE Telecommunications Conference, XP010636043 (2002).

Agustin et al., "LDC Construction With a Defined Structure," Vehicular Technology Conference, XP010700754, Oct. 2003.

Alamouti, "A Simple Transmit Diversity Technique for Wireless Communications," IEEE Journal on Select Areas in Communications, vol. 16, No. 8, Oct. 1998, pp. 1451-1458.

(56) References Cited

OTHER PUBLICATIONS

B.M Hochwald et al., "Systematic Design of Unitary Space-Time Constellations," IEEE Trans. On It, vol. 46, No. 6, Sep. 2000.
Bem et al., "Smart Antennas for Mobile Communications Systems," International Conference on Microwaves, Radar and Wireless Communications, vol. 3, May 22, 2000, pp. 120-130, XP010537479.
Bourdoux et al., "Non-reciprocal transceivers in OFDM/SDMA Systems: Impact and Mitigation," Radio and Wireless Conference, Aug. 10, 2003, pp. 183-186, XP010656728.
Bruhl et al., "Investigation of Front-end Requirements for MIMO-Systems Using Downlink Pre-Distortion," European Personal Mobile Communications Conference, 2003, pp. 472-476, XP002330243.
Crow, I.: "The Fourier Matrix," Apr. 27, 2001, http://www.maths.abdn.ac.uk/~lgc/tch/mx4002/notes/node91.html, pp. 1-3.
Jungnickel et al., "A Mimo System with Reciprocal Transceivers for the Time-Division Duplex Mode," Antennas and Propagation Society International Symposium, vol. 2, Jun. 20, 2004, pp. 1267-1270, XP010721570.
Laroia R et al., "Enhanced Opportunistic Beamforming," Vehicular Technology Conference, 2003. VTC 2003-Fall. IEEE 58th Orlando, FL, USA Oct. 6-9, 2003, pp. 1762-1766, XP010702878.
Liu et al., "OFDM-MIMO WLAN AP Front-end Gain and Phase Mismatch Calibration," IEEE Radio and Wireless Conference, Sep. 2004, pp. 151-154, XP002330244.
Narula, at al., "Performance Limits of Coded Diversity Methods for Transmitter Antenna Arrays," IEEE Transactions on Information Theory, vol. 45, No. 7, Nov. 1999, pp. 2418-2433.
T.L. Marzetta, B. Hassibi, B.M Hochwald, "Structured Unitary Space-Time Autocoding Constellations," IEEE Trans. On It, vol. 48, No. 4, Apr. 2002.
IEEE Std. 802.11a-1999, Part 11: Wireless LAN Medium Access Control (MAC) and Physical Layer (PHY) Specifications, Amendment 1: High-Speed Physical Layer in the 5 GHz Band.
IEEE Std. 802:11g-2003, Part 11: Wireless LAN Medium Access Control (MAC) and Physical Layer (PHY) Specifications, Amendment 4: Further Higher Data Rate Extension in the 2.4 GHz Band.
"Part 11: Wireless LAN Medium Access Control (MAC) and Physical Layer (PHY) Specifications: High-Speed Physical Layer in the 5GHz Band," IEEE Standards 802.11a, Sep. 1999.
International Search Report—PCT/US05/015042, International Search Authority—European Patent Office, Sep. 21, 2005.
Written Opinion—PCT/US05/015042, International Search Authority—European Patent Office, Sep. 21, 2005.
Written Opinion IPEA—PCT/US05/015042—IPEA/US, Apr. 18, 2006.
International Preliminary Report on Patentability—PCT/US05/015042, IPEA/US, Sep. 11, 2006.
Auer, G., Channel Estimation for OFDM With Cyclic Delay Diversity, Personal, Indoor and Mobile Radio Communications, 2004. PIMRC 2004, 15th IEEE International Symposium on, Sep. 5, 2004, vol. 3, pp. 1792-1796.
Bauch, G. et al., Orthogonal Frequency Division Multiple Access With Cyclic Delay Diversity, Smart Antennas, 2004, ITG Workshop on Mar. 18, 2004, pp. 17-24.
Masoud Sharif, Babak Hassibi, On the Capacity of MIMO Broadcast Channel With Partial Side Information, Signals, Systems and Computers, 2003, Conference Record of the Thirty-Seventh Asilomar Conference, Nov. 12, 2003.
Winters, J. "Smart antennas for wireless systems", IEEE Personal Communications, Dec. 5, 2003, pp. 1-113.
Antenna-Theory.com, "Steering Vector", http://www.antenna-theory.com, pp. 1., No date given.
Doonstnejad et al, "Space-time Spreading Codes for a Multiuser MIMO System," Institute of Electrical and Electronics Engineers, Conference Record of the 36th. Asilomar Conference on Signals, Systems, & Computers, Pacific Grove, California, Nov. 3-6, 2002, pp. 1374-1378, XP10638423.

Farrokhi et al., "Link-Optimal Space-Time Processing with Multiple Transmit and Receive Antennas, " IEEE Communications Letters, vol. 5, No. 3, pp. 85-87(Mar. 2003).
Goldsmith et al., "Capacity Limits of MIMO Channels, " IEEE Journal on Selected Areas in Communications, vol. 21, No. 5, pp. 684-702, Jun. 2003.
Hanzo et al., Single And Multi-Carrier Ds-CDMA, "Space-Time Spreading Aided Single-Carrier Wideband CDMA Communicating Over Multipath Nakagami Fading Channels," Chapter 8, pp. 279-310, John Wiley & Sons, England, 2003 (XP-002357231).
Hochwald et al., "A Transmitter Diversity Scheme for Wideband CDMA Systems based on Space-time Spreading", Selected Areas in Communications, vol. 19, No. 1, Jan. 2001.
Hochwald et al., "Unitary Space-Time Modulation for Multiple-Antenna Communications in Rayleigh Flat Fading, " IEEE Transactions on Information Theory, vol. 46, No. 2, pp. 543-564 (2000).
Ketchum, John, et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).
Li, et al., "Transmit Diversity Over Quasi-Static Fading Channels Using Multiple Antennas And Random Signal Mapping," IEEE Transactions on Communications, vol. 51, No. 11, Nov. 2003, pp. 1918-1926.
Liu, Jung-Tao: "Successive decoding of multiple space time coded streams in multi-input multi-output systems," Global Telecommunications Conference, 2002. Globecom '02. IEEE, USA, Nov. 21, 2002, 1007-1011 vol. 1.
Marzetta et al., "Structured Unitary Space-Time Autocoding Constellations, "IEEE Transactions on Information Theory, vol. 48, No. 4, Apr. 2002, pp. 942-950.
Medles et al., "Multistream Space-Time Coding by Spatial Spreading, Scrambling and Delay Diversity," IEEE International Conference on Acoustics, Speech and Signal Processing, vol. 4 of 4, XP-10803892, pp. 2429-2432 (2002).
Sharif et al., "On the Capacity of MIMO Broadcast Channel with Partial Side Information", Department of Electrical Engineering, CA Institute of Engineering, IEEE 2002, pp. 958-962.
Suthaharan et al.: Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.
Yao, Huan, "Efficient Signal, Code, and Receiver Designs for MIMO Communication Systems," Ph.D. Thesis, Massachusetts Institute of Technology, Cambridge, Massachusetts, 2003.
Yu and Cioffi, "Trellis Precoding for the Broadcast Channel," IEEE Global Telecommunications Conference, vol. 2, Electrical Engineering Department, Stanford, University, Stanford, California (2001), pp. 1344-1348.
Taiwan Search Report—TW093139437—TIPO—May 16, 2012.
Taiwan Search Report—TW094114588—TIPO—Mar. 14, 2012.
Bello: "Characterization of Randomly Time-Variante Linear Channels," Communications Systems, IEEE transactions on, vol. 11, Issue 4, pp. 360-393, Dec. 1963.
Branka et al., "Performance Limits of Multiple-Input Multiple-Output Wireless Communication Systems", Space-Time Coding, John Wiley & Sons. Ltd, Apr. 2003, England, pp. 1-9.
Giacomantone, Javier Oscar, "Tradeoffs in Arithmetic Architectures for Cordic Algorithm Design.", pp. 1-9, CeTAD—Fac. De Ingenieria—UNLP, Argentina [presented at Iberchip VII Workshop, Session 4, Montevideo, Uruguay, Mar. 21-23, 2001].
Gotze, J., et al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.
Griffin, Grant R., "Cordic FAQ," lowegian's dspGuru. pp. 1-6.
Hemkumar N. D., et al. "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, Jun. 29, 1993, pp. 122-129.
Hsiao, S. et al.: "Parallel Singular Value Decomposition of Complex Matrices Using Multidimensional CORDIC Algorithms" IEEE Transactions of Signal Processing, IEEE Service Center, New York, NY, UA, vol. 44, No. 3, pp. 685-697, Mar. 1, 1996.

(56) References Cited

OTHER PUBLICATIONS

Jihoon Choi et al., "Interpolation Based Transmit Beamforming for MIMO-OFDM with Limited Feedback", IEEE Communications Society, 2004, 249-253, Austin, Texas.
Kim, M. et al.: "Design of Jacobi EVD Processor Based on CORDIC for DOA Estimation with Music Algorithm." Personal, Indoor, and Mobile Radio Communications, 2002. pp. 120-124, The 13th IEEE International Symposium on Sep. 15-18, 2002, Piscataway, NJ, USA, IEEE.
Michalke C et al: Efficient tracking of eigenspaces and its application to eigenbeanforming Personal, Indoor and Mobile Radio Communications 14th IEEE Proceedings, Sep. 7, 2013, pp. 2847-2851, Sections II.B and III.C XP010678152.
Nowak, et al., "An Efficient Implementation of a 256-point FFT Processor with CORDIC for OFDM Systems," Delft University of Technology, Faculty of Information Technology and Systems Circuits and Systems Group, pp. 427-434, ISBN: 90-73461-15-4. 1998. STW, 1998 1026-01:.
Oksa G et al: "Multi-level parallelism in the block-jacobi SVD algorithm" Parallel and Distribution Processing, 2001. Proceedings. Ninth Euromicr O Workshop. IEEE, Feb. 7, 2011, pp. 306-313, XP010532138, ISBN: 978-0/7695-0987-7.
Ralf Seeger et al: "Advance Eigenbeamforming for the 3GPP UMTS FDD Downlink" ITG IEEE Workshop on Smart Antennas, XX, XX, Apr. 4, 2004, pp. 1-8, XP002468805, Section III.
Schafer F., et al.: "Efficient Tracking of Eigenspaces and its application to MIMO systems" Proceedings of the IST Mobile and Wireless Communications Summit, Jun. 18, 2003, pp. 1-6, XP002478514.
Taiwan Search Report—TW094130237—TIPO—Oct. 3, 2011.
Bossed, et al., "On Cyclic Delay Diversity in OFDM Based Transmission Schemes," 7th International OFDM-Workshop (INOWO), Sep. 2002, XP002338873, Hamburg, Germany.
Damen et al., "Systematic Construction of Full Diversity Algebraic Constellations", IEEE Transactions on Information Theroty, vol. 49, No. 12, Dec. 2003.

* cited by examiner

CONTINUOUS BEAMFORMING FOR A MIMO-OFDM SYSTEM

CLAIM OF PRIORITY UNDER 35 U.S.C. §119

The present Application for Patent claims priority to Provisional Application Ser. No. 60/578,656, entitled "Continuous Beamforming for a MIMO-OFDM System," filed Jun. 9, 2004, Provisional Application Ser. No. 60/576,719, entitled "Continuous Beamforming for a MIMO-OFDM System," filed Jun. 2, 2004, and Provisional Application Ser. No. 60/569,103, entitled "Steering Diversity for an OFDM-Based Multi-Antenna Communication System," filed May 7, 2004, all assigned to the assignee hereof and hereby expressly incorporated by reference herein.

REFERENCE TO CO-PENDING APPLICATIONS FOR PATENT

This application is related to the following co-pending U.S. patent applications, each assigned to the present assignee and each hereby incorporated by reference:

U.S. application Ser. No. 10/892,732, filed on Jul. 15, 2004;

U.S. application Ser. No. 10/882,491, filed on Jun. 30, 2004;

U.S. application Ser. No. 10/821,390, filed on Apr. 9, 2004;

U.S. application Ser. No. 10/794,918, filed on Mar. 5, 2004; and

U.S. application Ser. No. 10/781,951, filed on Feb. 18, 2004.

BACKGROUND

1. Field

The present invention relates generally to communication, and more specifically to data transmission in a multiple-input multiple-output (MIMO) communication system that utilizes orthogonal frequency division multiplexing (OFDM).

2. Background

A MIMO system employs multiple (T) transmit antennas at a transmitting entity and multiple (R) receive antennas at a receiving entity for data transmission. A MIMO channel formed by the T transmit antennas and R receive antennas may be decomposed into S spatial channels, where $S \leq \min\{T, R\}$. The S spatial channels may be used to transmit data in parallel to achieve higher throughput and/or redundantly to achieve greater reliability.

OFDM is a multi-carrier modulation technique that effectively partitions the overall system bandwidth into multiple (K) orthogonal frequency subbands. These subbands are also referred to as tones, subcarriers, bins, and frequency channels. With OFDM, each subband is associated with a respective subcarrier that may be modulated with data.

A MIMO-OFDM system is a MIMO system that utilizes OFDM. The MIMO-OFDM system has S spatial channels for each of the K subbands. Each spatial channel of each subband may be called a "transmission channel". Each transmission channel may experience various deleterious channel conditions such as, e.g., fading, multipath, and interference effects. The transmission channels for the MIMO channel may also experience different channel conditions and may achieve different signal-to-noise-and-interference ratios (SNRs). The SNR of each transmission channel determines its transmission capacity, which is typically quantified by a particular data rate that may be reliably transmitted on the transmission channel. For a time variant wireless channel, the channel conditions change over time and the SNR of each transmission channel also changes over time. The different SNRs for different transmission channels plus the time varying nature of the SNR for each transmission channel make it challenging to efficiently transmit data in a MIMO system.

If the transmitting entity has knowledge of the channel condition, then it may transmit data in a manner to more fully utilize the capacity of each transmission channel. However, if the transmitting entity does not know the channel condition, then it may need to transmit data at a low rate so that the data transmission can be reliably decoded by the receiving entity even with the worst-case channel condition. Performance would then be dictated by the expected worst-case channel condition, which is highly undesirable.

There is therefore a need in the art for techniques to more efficiently transmit data in a MIMO-OFDM system, especially when the channel condition is not known by the transmitting entity.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
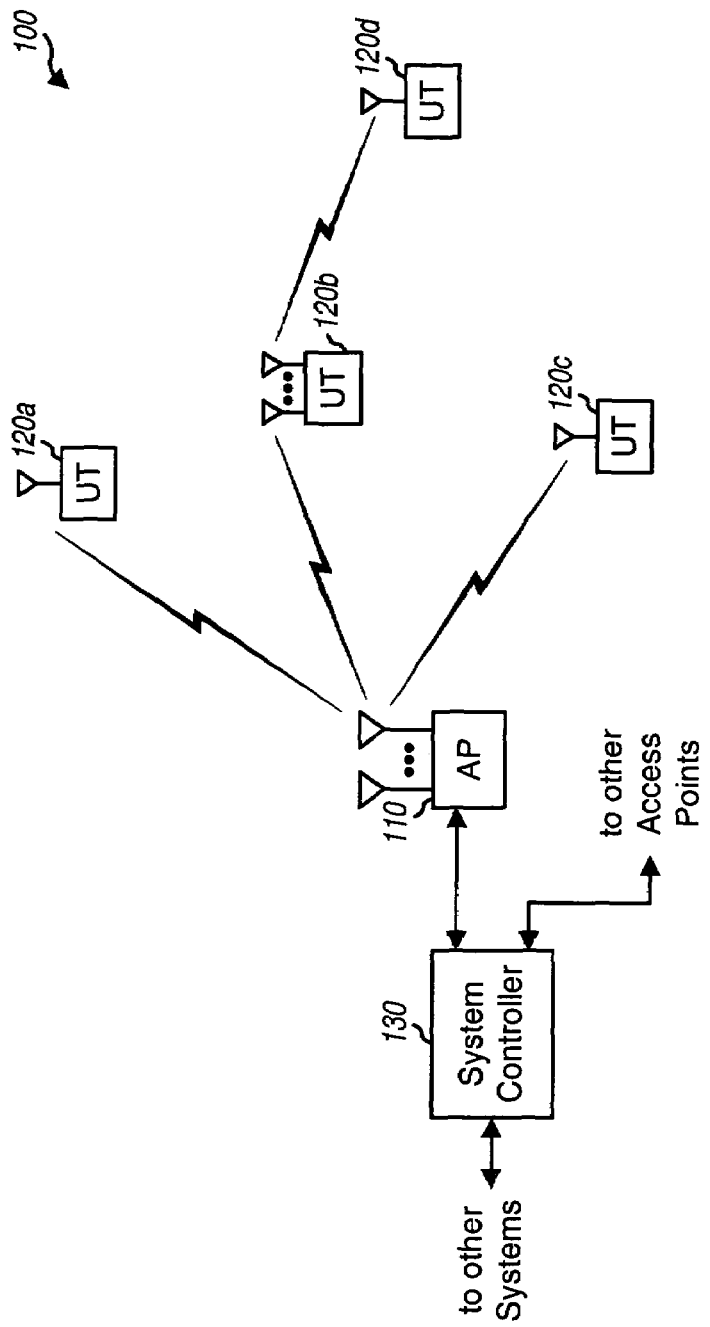
FIG. 1 shows a MIMO-OFDM system with an access point and user terminals.

FIG. 1 shows a MIMO-OFDM system 100 with an access point (AP) 110 and user terminals (UTs) 120. An access point is generally a fixed station that communicates with the user terminals and may also be referred to as a base station or some other terminology. A user terminal may be fixed or mobile and may also be referred to as a mobile station, a wireless device, a user equipment (UE), or some other terminology. For a centralized network architecture, a system controller 130 couples to the access points and provides coordination and control for these access points.

Access point 110 is equipped with multiple antennas for data transmission and reception. Each user terminal 120 is also equipped with multiple antennas for data transmission and reception. A user terminal may communicate with the access point, in which case the roles of access point and user terminal are established. A user terminal may also communicate peer-to-peer with another user terminal.

Figure 2:
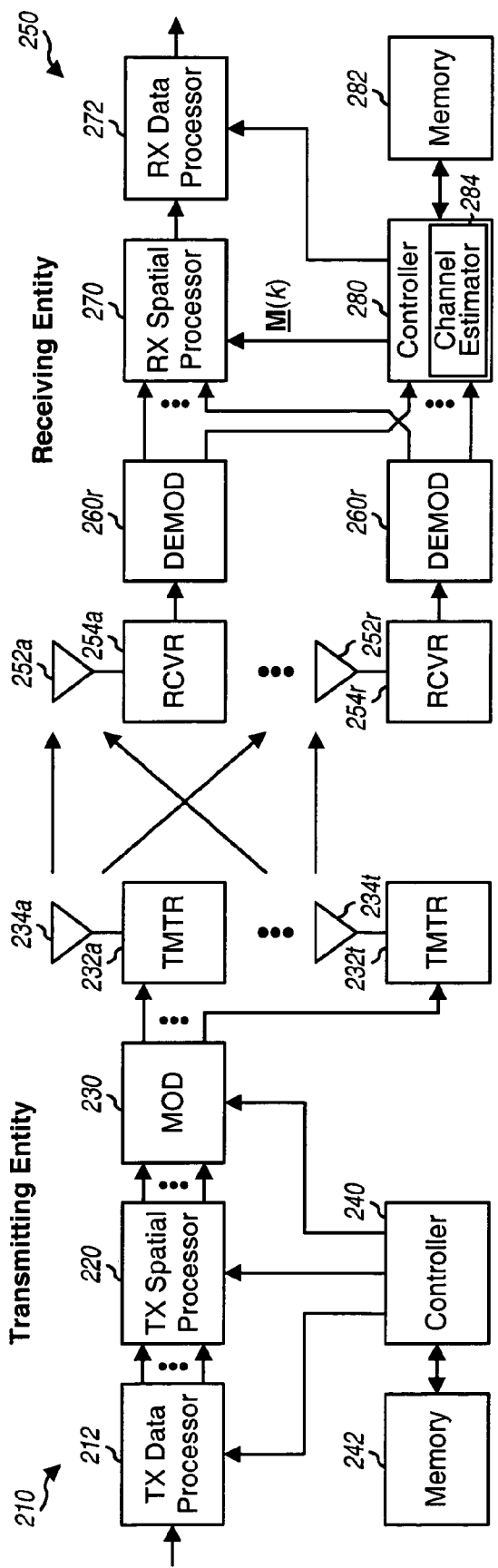
FIG. 2 shows a block diagram of a transmitting entity and a receiving entity.

FIG. 2 shows a block diagram of a transmitting entity 210 and a receiving entity 250 in system 100. Transmitting entity 210 is equipped with multiple (T) transmit antennas and may be an access point or a user terminal. Receiving entity 250 is equipped with multiple (R) antennas and may also be an access point or a user terminal.

At transmitting entity 210, a TX data processor 212 processes (e.g., encodes, interleaves, and symbol maps) traffic/packet data to generate data symbols. As used herein, a "data symbol" is a modulation symbol for data, a "pilot symbol" is a modulation symbol for pilot (which is data that is known a priori by both the transmitting and receiving entities), a "transmit symbol" is a symbol to be sent on one subband of one transmit antenna, and a "received symbol" is a symbol obtained on one subband of one receive antenna. A TX spatial processor 220 receives and demultiplexes pilot and data symbols onto the proper subbands, performs spatial processing as described below, and provides T streams of transmit symbols for the T transmit antennas. A modulator (MOD) 230 performs OFDM modulation on each of the T transmit symbol streams and provides T streams of time-domain samples to T transmitter units (TMTR) 232a through 232t. Each transmitter unit 232 processes (e.g., converts to analog, amplifies, filters, and frequency upconverts) its sample stream to generate a modulated signal. Transmitter units 232a through 232t provide T modulated signals for transmission from T antennas 234a through 234t, respectively.

At receiving entity 250, R antennas 252a through 252r receive the T transmitted signals, and each antenna 252 provides a received signal to a respective receiver unit (RCVR) 254. Each receiver unit 254 processes its received signal and provides a stream of input samples to a corresponding demodulator (DEMOD) 260. Each demodulator 260 performs OFDM demodulation on its input sample stream to obtain receive data and pilot symbols, provides the received data symbols to a receive (RX) spatial processor 270, and provides the received pilot symbols to a channel estimator 284 within a controller 280. Channel estimator 284 derives a channel response estimate for an actual or effective MIMO channel between transmitting entity 210 and receiving entity 250 for each subband used for data transmission. Controller 280 derives spatial filter matrices based on the MIMO channel response estimates. RX spatial processor 270 performs receiver spatial processing (or spatial matched filtering) on the received data symbols for each subband with the spatial filter matrix derived for that subband and provides detected data symbols for the subband. The detected data symbols are estimates of the data symbols sent by transmitting entity 210. An RX data processor 272 then processes the detected data symbols for all subbands and provides decoded data.

Controllers 240 and 280 direct the operation of the processing units at transmitting entity 210 and receiving entity 250, respectively. Memory units 242 and 282 store data and/or program code used by controllers 240 and 280, respectively.

Figure 3:
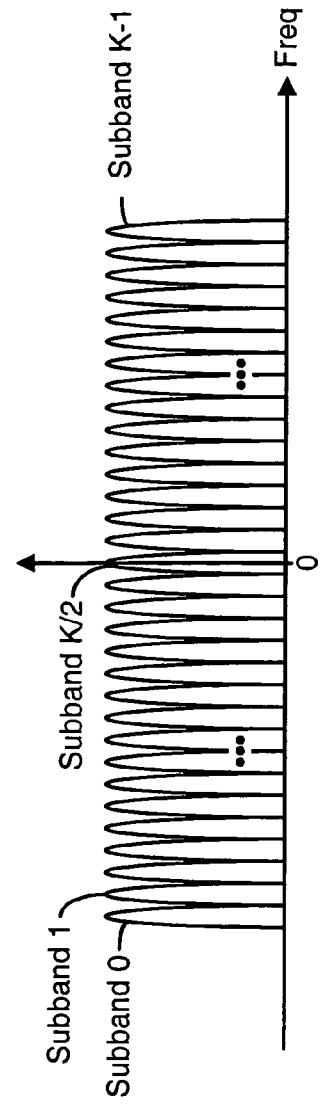
FIG. 3 shows an OFDM waveform in the frequency domain.

FIG. 3 shows an OFDM waveform in the frequency domain. OFDM provides K total subbands, and the subcarrier for each subband may be individually modulated with data. Of the K total subbands, $N_D$ subbands may be used for data transmission, $N_P$ subbands may be used for pilot transmission, and the remaining $N_G$ subbands may be unused and serve as guard subbands, where $K=N_D+N_P+N_G$. In general, system 100 may utilize any OFDM structure with any number of data, pilot, guard, and total subbands. For simplicity, the following description assumes that all K subbands are usable for data and pilot transmission.

System 100 may support data transmission using multiple operating modes. Each operating mode utilizes different spatial processing at the transmitting entity. In an embodiment, each operating mode may utilize (1) "eigensteering" to transmit data symbols on orthogonal spatial channels (or "eigenmodes") of a MIMO channel, (2) "matrix steering" to transmit each data symbol on all S spatial channels of the MIMO channel, or (3) no spatial processing to transmit each data symbol from one transmit antenna. Eigensteering is also called eigenmode transmission or full channel state information (full-CSI) transmission. Matrix steering may be used to achieve spatial diversity. Data transmission without spatial processing is also called partial-CSI transmission. In an embodiment, each operating mode may or may not utilize beamforming to introduce additional diversity for the T sample streams sent from the T transmit antennas.

The operating mode with the combination of matrix steering and beamforming is called "spatial spreading". The transmitting entity may use spatial spreading to achieve spatial and frequency/time diversity, for example, if the transmitting entity does not know the MIMO channel response.

1. Transmitter Spatial Processing

In system 100, the MIMO channel formed by the T transmit antennas at transmitting entity 210 and the R receive antennas at receiving entity 250 may be characterized by an R×T channel response matrix H(k) for each subband k, which may be given as:

$$H(k) = \begin{bmatrix} h_{0,0}(k) & h_{0,1}(k) & \ldots & h_{0,T-1}(k) \\ h_{1,0}(k) & h_{1,1}(k) & \ldots & h_{1,T-1}(k) \\ \vdots & \vdots & \ddots & \vdots \\ h_{R-1,0}(k) & h_{R-1,1}(k) & \ldots & h_{R-1,T-1}(k) \end{bmatrix}, \quad \text{Eq (1)}$$

for $k = 0, \ldots, K-1$, where entry $h_{i,j}(k)$, for $i=0,\ldots,R-1$ and $j=0,\ldots,T-1$, denotes the coupling or complex channel gain between transmit antenna j and receive antenna i for subband k. For simplicity, the MIMO channel is assumed to be full rank with $S=T\leq R$.

For data transmission with eigensteering, eigenvalue decomposition may be performed on a correlation matrix of H(k) to obtain S eigenmodes of H(k), as follows:

$$R(k)=H^H(k)\cdot H(k)=E(k)\cdot \Lambda(k)\cdot E^H(k), \quad \text{Eq (2)}$$

where
  R(k) is a T×T correlation matrix of H(k);
  E(k) is a T×T unitary matrix whose columns are eigenvectors of R(k);
  Λ(k) is a T×T diagonal matrix of eigenvalues of R(k); and
  "$^H$" denotes a conjugate transpose.

A unitary matrix U is characterized by the property $U^H \cdot U=I$, where I is the identity matrix. The columns of a unitary matrix are orthogonal to one another, and each column has unit power. The matrix E(k) is also called an "eigenmode" matrix or a "transmit" matrix and may be used for spatial processing by the transmitting entity to transmit data on the S eigenmodes of H(k). The eigenmodes may be viewed as orthogonal spatial channels obtained through decomposition. The diagonal entries of Λ(k) are eigenvalues of R(k), which represent the power gains for the S eigenmodes. The eigenvalues in Λ(k) may be ordered from largest to smallest, and the columns of E(k) may be ordered correspondingly. Singular value decomposition may also be performed to obtain matrices of left and right eigenvectors, which may be used for eigensteering.

For data transmission with eigensteering, the transmitting entity may perform spatial processing for each subband k as follows:

$$z_{es}(k) = E(k) \cdot s(k), \quad \text{Eq (3)}$$

where s(k) is a vector with up to S data symbols to be sent on subband k; and $z_{es}(k)$ is a vector with T spatially processed symbols for subband k.

In general, D data symbols may be sent simultaneously on D (best) eigenmodes of H(k) for each subband k, where $1 \leq D \leq S$. The D data symbols in s(k) are spatially processed with D columns of E(k) corresponding to the D selected eigenmodes.

For data transmission with matrix steering, the transmitting entity may perform spatial processing for each subband k as follows:

$$z_{ss}(k) = V(k) \cdot s(k), \quad \text{Eq (4)}$$

where V(k) is a unitary steering matrix for subband k; and $z_{ss}(k)$ is a vector with up to T spread symbols for subband k.

Each data symbol in s(k) is multiplied with a respective column of V(k) to obtain up to T spread symbols. The steering matrix V(k) may be generated in a manner to simplify the matrix multiplication in equation (4), as described below.

In general, D data symbols may be sent simultaneously on each subband k with matrix steering, where $1 \leq D \leq S$. The D data symbols in s(k) may be multiplied with a T×D unitary steering matrix V(k) to obtain T spatially processed symbols for $z_{ss}(k)$. Each spatially processed symbol for each subband k includes a component of each of the D data symbols being sent on subband k. The T spatially processed symbols for each subband k are then transmitted on the S spatial channels of H(k).

For partial-CSI transmission, the transmitting entity may perform spatial processing for each subband k as follows:

$$z_{pcsi}(k) = s(k), \quad \text{Eq (5)}$$

where $z_{pcsi}(k)$ is a vector with up to T data symbols to be sent on subband k. In effect, the transmitting entity performs spatial processing with the identity matrix I for partial-CSI transmission.

The transmitting entity thus spatially processes the data vector s(k) for each subband k to obtain a corresponding vector z(k) of spatially processed symbols for that subband. The vector z(k) is equal to $z_{es}(k)$ for eigensteering, $z_{ss}(k)$ for matrix steering, and $z_{pcsi}(k)$ for partial-CSI transmission.

2. Beamforming

The transmitting entity may selectively perform beamforming on the vector z(k) for each subband k, as follows:

$$x(k) = B(k) \cdot z(k), \quad \text{Eq (6)}$$

where B(k) is a T×T beamforming matrix for subband k; and x(k) is a vector with T transmit symbols to be sent from the T transmit antennas for subband k.

If beamforming is not performed, then the beamforming matrix B(k) is replaced with the identity matrix I in equation (6).

The transmit vector $X_{bes}(k)$ for eigensteering with beamforming may be expressed as:

$$x_{bes}(k) = B(k) \cdot E(k) \cdot s(k). \quad \text{Eq (7)}$$

The transmit vector $X_{bss}(k)$ for spatial spreading, which is matrix steering with beamforming, may be expressed as:

$$x_{bss}(k) = B(k) \cdot V(k) \cdot s(k). \quad \text{Eq (8)}$$

A matrix $B(k) \cdot V(k)$ may be pre-computed for each subband k. In this case, the transmit vector $x_{bss}(k)$ may be obtained with a single matrix multiply. The matrices V(k) and B(k) may also be applied in two steps and possibly in different manners. For example, the matrix V(k) may be applied in the frequency domain with a matrix multiply and the matrix B(k) may be applied in the time domain with circular or linear delays, as described below.

The transmit vector $x_{bns}(k)$ for partial-CSI transmission with beamforming may be expressed as:

$$x_{bns}(k) = B(k) \cdot s(k). \quad \text{Eq (9)}$$

The beamforming matrix B(k) for each subband k is a diagonal matrix having the following form:

$$B(k) = \begin{bmatrix} b_0(k) & 0 & \cdots & 0 \\ 0 & b_1(k) & \cdots & 0 \\ \vdots & \vdots & \ddots & \vdots \\ 0 & 0 & \cdots & b_{T-1}(k) \end{bmatrix} \quad \text{Eq (10)}$$

for $k = 0, \ldots, K-1$, where $b_i(k)$ is a weight for subband k of transmit antenna i. As shown in equation (6), the i-th element of z(k) is multiplied by the i-th diagonal weight in B(k).

The beamforming matrices for the K subbands may be defined such that continuous beamforming is achieved across the K subbands. The beamforming matrix B(k) for each subband k defines an antenna beam for that subband. K different beamforming matrices may be used for the K subbands to obtain different antenna beams across the subbands. The K beamforming matrices may be varied in a continuous manner (instead of an abrupt or discontinuous manner) so that the antenna beams change in a continuous manner across the K subbands. Continuous beamforming thus refers to a continuous change in the antenna beams across the K subbands.

In an embodiment, the weights in the beamforming matrix B(k) for each subband k are defined as follows:

$$b_i(k) = g(i) \cdot e^{j \frac{2\pi \cdot i \cdot k}{K}}, \quad \text{Eq (11)}$$

for $i = 0, \ldots, T-1$ and $k = 0, \ldots, K-1$, where g(i) is a complex gain for transmit antenna i.

The magnitude of the complex gain for each transmit antenna may be set to one, or $\|g(i)\| = 1.0$ for $i = 0, \ldots, T-1$. The weights shown in equation (11) correspond to a progressive phase shift across the K subbands of each transmit antenna, with the phase shift changing at different rates for the T transmit antennas. These weights effectively form a different beam for each subband for a linear array of T equally spaced antennas.

In a specific embodiment, the weights are defined as follows:

$$b_i(k) = e^{-j\pi \cdot i} \cdot e^{j \frac{2\pi \cdot i \cdot k}{K}} = e^{j 2\pi \frac{i}{K}(k - \frac{K}{2})}, \quad \text{Eq (12)}$$

for $i = 0, \ldots, T-1$ and $k = 0, \ldots, K-1$. The embodiment shown in equation (12) uses $g(i) = e^{-j\pi \cdot i}$ for equation (11). This results in a phase shift of zero being applied to subband K/2+1 for each antenna.

Figure 10:
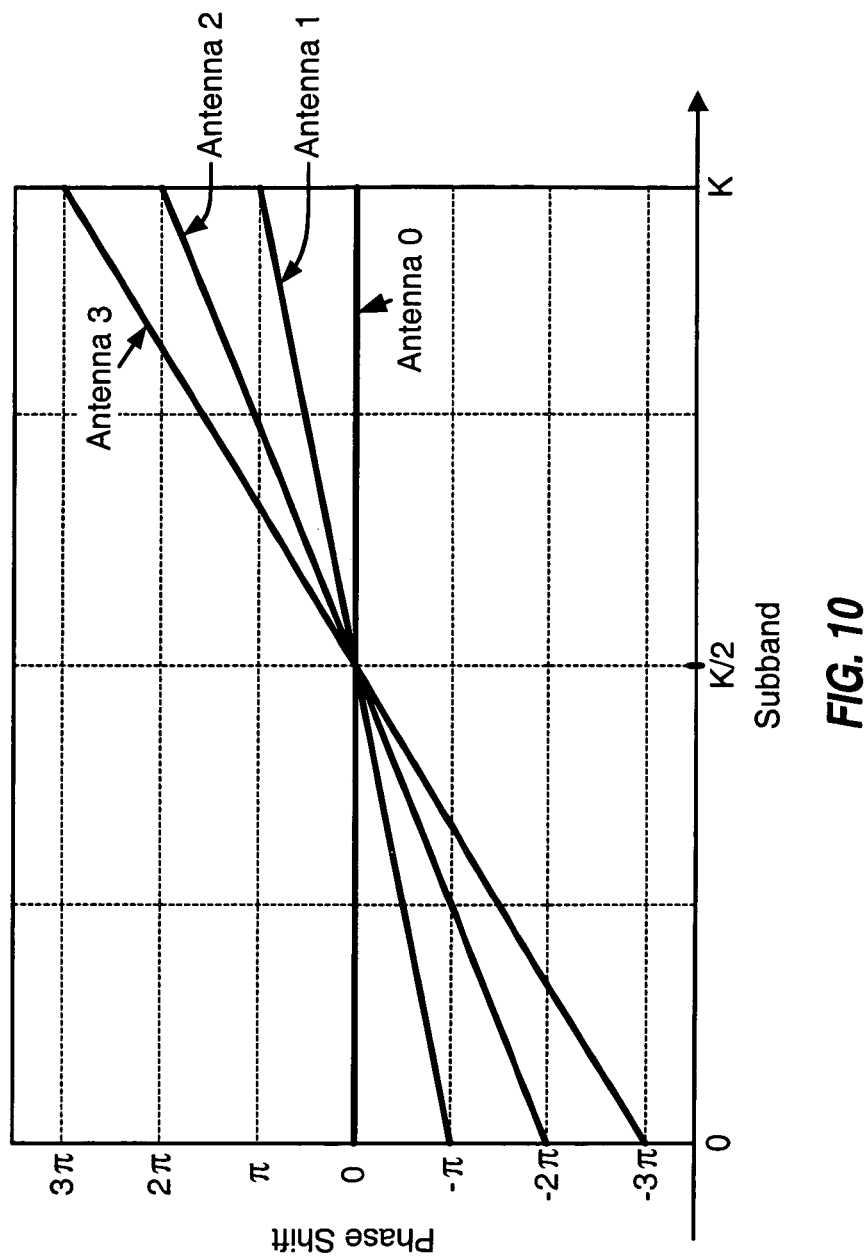
FIG. 10 shows plots of linear phase shifts across subbands for four antennas.

FIG. 10 shows plots of the phase shifts for each transmit antenna for a case with T=4. The center of the K subbands is typically considered to be at zero frequency. The weights generated based on equation (12) may be interpreted as creating a linear phase shift across the K subbands. Each transmit antenna i, for i=0, . . . , T-1, is associated with a phase slope of $2\pi \cdot i/K$. The phase shift for each subband k, for k=0, . . . , K-1, of transmit antenna i is given as $2\pi \cdot i \cdot (k-K/2)/K$. The use of $g(i)=e^{-j\pi \cdot i}$ result in subband k=K/2 observing a phase shift of zero.

The weights derived based on equation (12) may be viewed as a linear filter having a discrete frequency response of $G_i(k')$ for each transmit antenna i. This discrete frequency response may be expressed as:

$$G_i(k') = b_i(k' + K/2) = e^{j2\pi \frac{i \cdot k'}{K}}, \quad \text{Eq (13)}$$

for i=0, . . . , T-1 and k'=(-K/2) . . . (K/2-1). Subband index k is for a subband numbering scheme that places the zero frequency at subband $N_{center}=K/2$. Subband index k' is a shifted version of subband index k by K/2, or k'=k-K/2. This results in subband zero being at zero frequency for the new subband numbering scheme with index k'. $N_{center}$ may be equal to some other value instead of K/2 if index k is defined in some other manner (e.g., k=1, . . . , K) or if K is an odd integer value.

A discrete time-domain impulse response $g_i(n)$ for the linear filter may be obtained by performing a K-point inverse discrete Fourier transform (IDFT) on the discrete frequency response $G_i(k')$. The impulse response $g_i(n)$ may be expressed as:

$$\begin{aligned} g_i(n) &= \frac{1}{K} \cdot \sum_{k'=-K/2}^{K/2-1} G_i(k') \cdot e^{j2\pi \frac{n \cdot k'}{K}}, \\ &= \frac{1}{K} \cdot \sum_{k'=-K/2}^{K/2-1} e^{j2\pi \frac{i \cdot k'}{K}} \cdot e^{j2\pi \frac{n \cdot k'}{K}}, \\ &= \frac{1}{K} \cdot \sum_{k'=-K/2}^{K/2-1} e^{j2\pi \frac{k'}{K}(i+n)}, \\ &= \begin{cases} 1 & \text{for } n = -i \\ 0 & \text{otherwise} \end{cases} \end{aligned} \quad \text{Eq (14)}$$

where n is an index for sample period and has a range of n=0, . . . , K-1. Equation (14) indicates that the impulse response $g_i(n)$ for transmit antenna i has a single tap with unit-magnitude at a delay of i sample periods and is zero at all other delays.

Beamforming may be performed in the frequency domain or time domain. Beamforming may be performed in the frequency domain by (1) multiplying K spatially processed symbols $z_i(0)$ through $z_i(K-1)$ for each transmit antenna i with K weights $b_i(0)$ through $b_i(K-1)$ for that antenna to obtain K transmit symbols and (2) performing OFDM modulation on the K transmit symbols for each transmit antenna i to obtain K time-domain samples for that antenna. Equivalently, beamforming may be performed in the time domain by (1) performing a K-point IDFT on the K spatially processed symbols for each transmit antenna i to obtain K time-domain samples for that transmit antenna and (2) performing a circular convolution of the K time-domain samples for each transmit antenna i with the impulse response $g_i(n)$ for that antenna.

Figure 4:
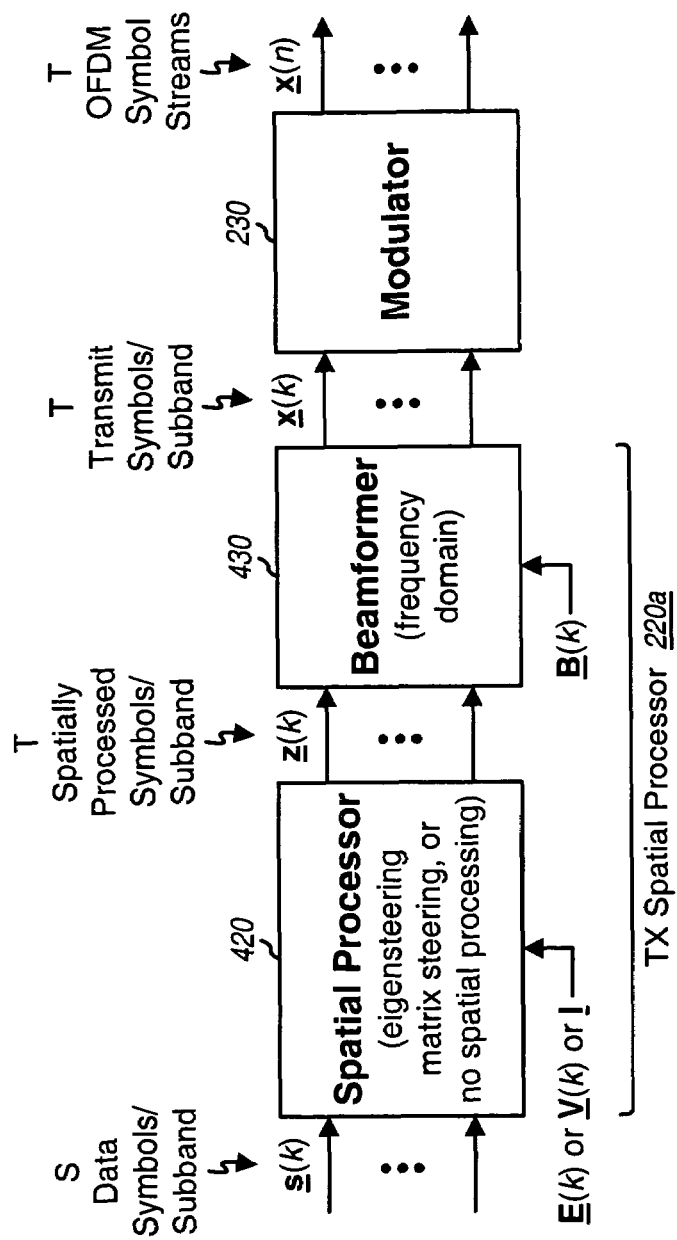
FIGS. 4 and 5 show a transmit (TX) spatial processor with a frequency-domain beamformer.

FIG. 4 shows a TX spatial processor 220a that performs beamforming in the frequency domain and is an embodiment of TX spatial processor 220 at transmitting entity 210. TX spatial processor 220a includes a spatial processor 420 and a beamformer 430. Spatial processor 420 performs spatial processing on the data symbols s(k) for each subband k with the eigenmode matrix E(k), the steering matrix V(k), or the identity matrix I and provides spatially processed symbols z(k) for that subband. Beamformer 430 multiplies the spatially processed symbols z(k) for each subband k with the beamforming matrix B(k) to obtain the transmit symbols x(k) for that subband. Modulator 230 performs OFDM modulation on the transmit symbols for each transmit antenna i to obtain a stream of OFDM symbols for that antenna.

Figure 5:
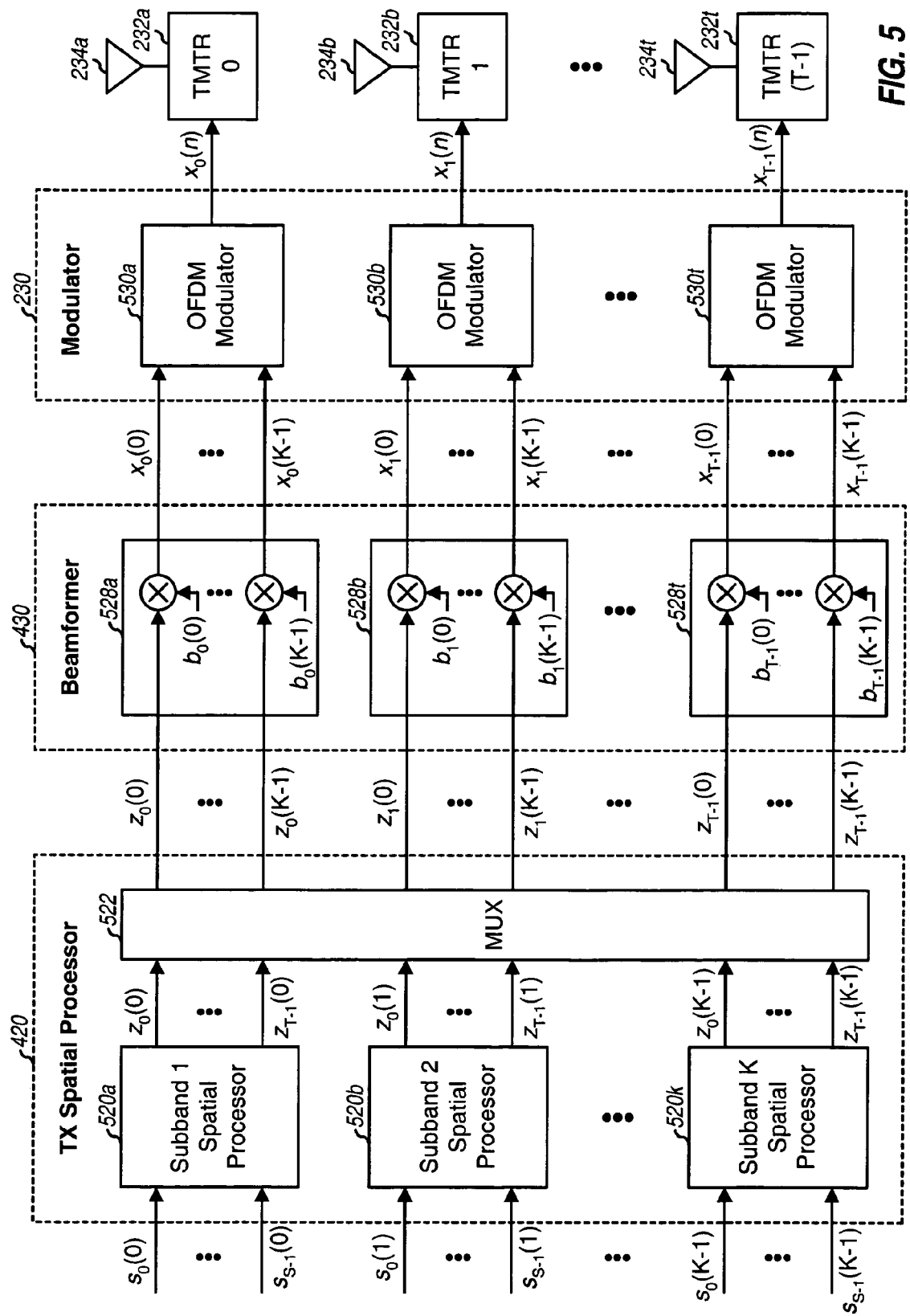

FIG. 5 shows an embodiment of spatial processor 420 and beamformer 430 within TX spatial processor 220a. Spatial processor 420 includes K subband spatial processors 520a through 520k for the K subbands and a multiplexer (MUX) 522. Each spatial processor 520 receives the symbols $s_0(k)$ through $s_{T-1}(k)$ in the vector s(k) for its subband, performs spatial processing on the data symbols with E(k), V(k), or I, and provides spatially processed symbols $z_0(k)$ through $z_{T-1}(k)$ in the vector z(k) for its subband. Multiplexer 522 receives the spatially processed symbols for all K subbands from spatial processors 520a through 520k and provides these symbols to the proper subbands and transmit antennas.

Beamformer 430 includes T multiplier sets 528a through 528t for the T transmit antennas. For each symbol period, each multiplier set 528 receives the K spatially processed symbols $z_i(0)$ through $z_i(K-1)$ for its transmit antenna i, multiplies these symbols with K weights $b_i(0)$ through $b_i(K-1)$ for transmit antenna i, and provides K transmit symbols $x_i(0)$ through $x_i(K-1)$ for transmit antenna i. For each symbol period, beamformer 430 provides T sets of K transmit symbols for the T transmit antennas.

Modulator 230 includes T OFDM modulator 530a through 530t for the T transmit antennas. Each OFDM modulator 530 receives the transmit symbols $x_i(0)$ through $x_i(K-1)$ for its transmit antenna i, performs OFDM modulation on the transmit symbols, and provides an OFDM symbol for transmit antenna i for each symbol period.

Figure 6:
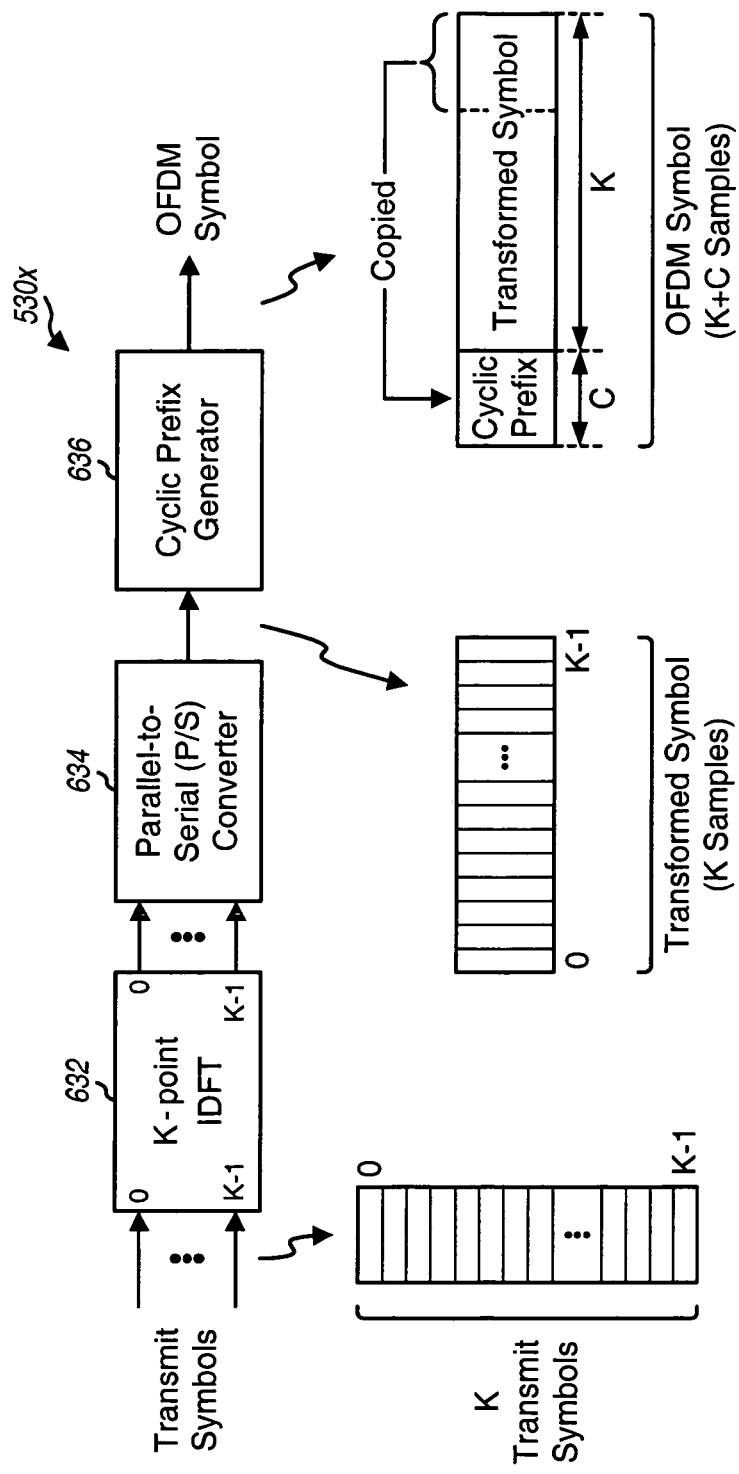
FIG. 6 shows a block diagram of an OFDM modulator.

FIG. 6 shows a block diagram of OFDM modulator 530x, which may be used for each of OFDM modulators 530a through 530t in FIG. 5. In each OFDM symbol period, one transmit symbol may be sent on each subband. (A signal value of zero, which is called a zero symbol period, is usually provided for each unused subband.) An DFT unit 632 receives K transmit symbols for the K subbands in each OFDM symbol period, transforms the K transmit symbols to the time domain with a K-point IDFT, and provides a "transformed" symbol that contains K time-domain samples. Each sample is a complex-value to be transmitted in one sample period. A parallel-to-serial (P/S) converter 634 serializes the K samples for each transformed symbol. A cyclic prefix generator 436 then repeats a portion (or C samples) of each transformed symbol to form an OFDM symbol that contains K+C samples. The cyclic prefix is used to combat inter-symbol interference (ISI) caused by frequency selective fading, which is a frequency response that varies across the overall system bandwidth. An OFDM symbol period (which is also referred to herein as simply a "symbol period") is the duration of one OFDM symbol and is equal to K+C sample periods.

Figure 7:
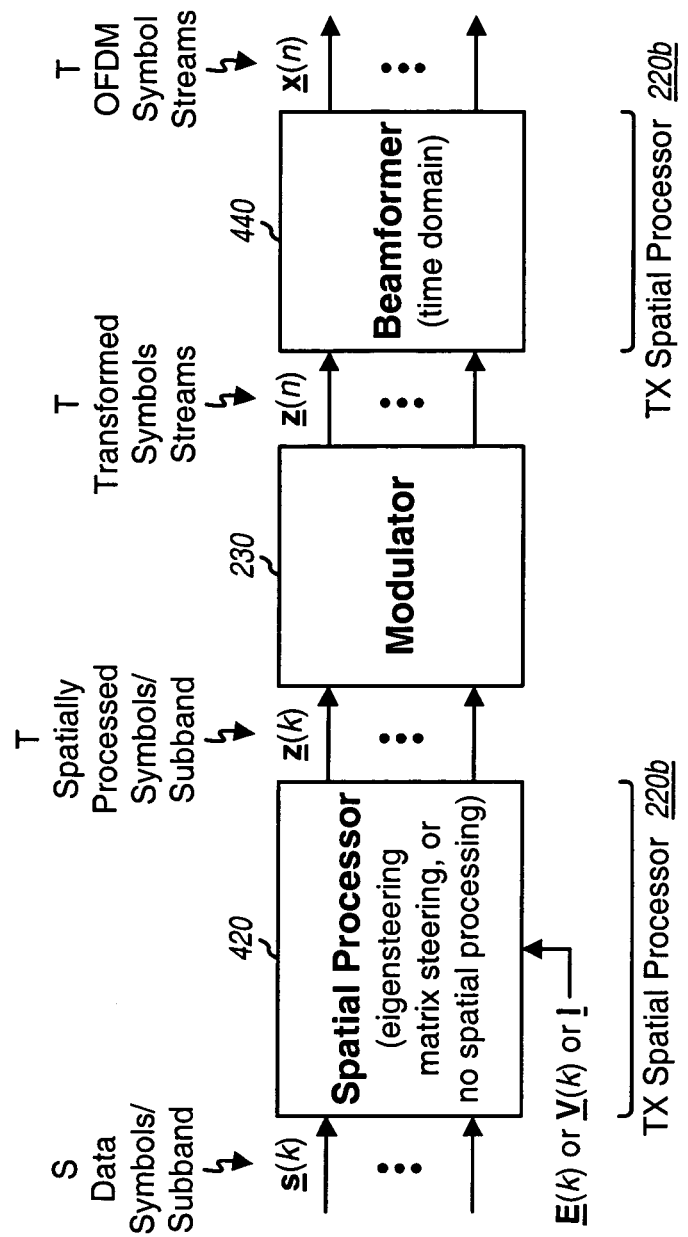
FIG. 7 shows a TX spatial processor with a time-domain beamformer.

FIG. 7 shows a TX spatial processor 220b that performs beamforming in the time domain and is another embodiment of TX spatial processor 220 at transmitting entity 210. TX spatial processor 220b includes spatial processor 420 and a beamformer 440. Spatial processor 420 performs spatial processing on the data symbols s(k) for each subband k and provides spatially processed symbols z(k) for that subband. Modulator 230 performs OFDM modulation on the spatially processed symbols for each antenna i and provides a stream of time-domain samples for that antenna. Beamformer 440 performs beamforming in the time-domain by either circularly shifting or linearly delaying the time-domain samples for each transmit antenna i.

Figure 8A:
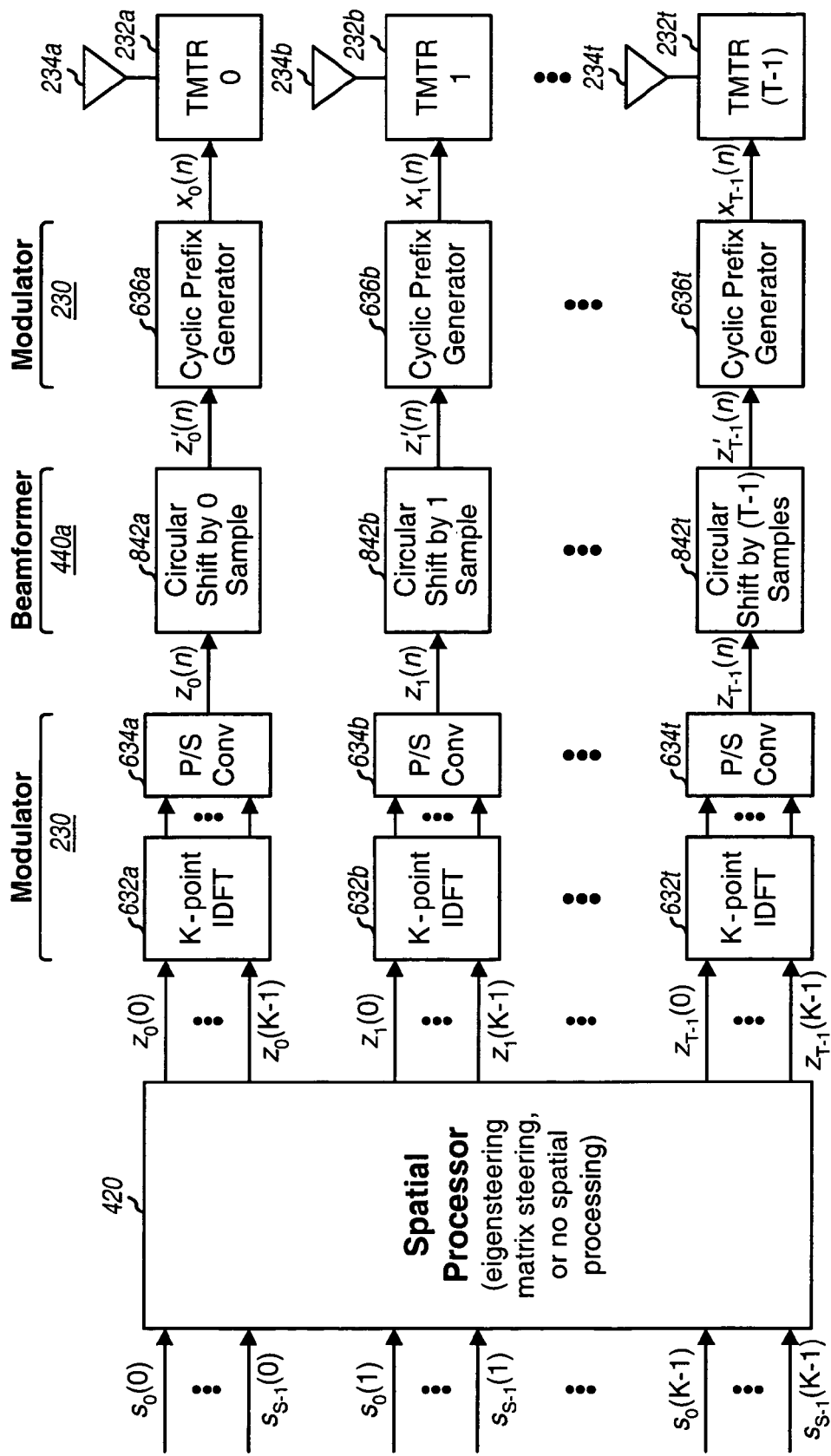
FIG. 8A shows a time-domain beamformer with circular shifting.

FIG. 8A shows a block diagram of modulator 230 and a beamformer 440a, which is one embodiment of beamformer 440 in FIG. 7. Modulator 230 includes T OFDM modulators for the T transmit antennas. Each OFDM modulator includes IDFT unit 632, P/S converter 634, and cyclic prefix generator 636, as shown in FIG. 6. The OFDM modulator for each transmit antenna i receives K spatially processed symbols $z_i(0)$ through $z_i(K-1)$ for the K subbands in each symbol period. Within the OFDM modulator, IDFT unit 632 performs a K-point IDFT on the K spatially processed symbols and provides K time-domain samples. P/S converter 634 serializes the K time-domain samples.

Beamformer 440a includes T circular shift units 842a through 842t for the T transmit antennas. Shift unit 842 for each transmit antenna i receives the K time-domain samples from P/S converter 634 for transmit antenna i, performs a circular shift of the K time-domain samples by i samples, and provides a circular-shifted transformed symbol $\{z'_i(n)\}$ containing K samples. In particular, shift unit 842a performs a circular shift of zero sample on the transformed symbol $\{z'_0(n)\}$ for transmit antenna 234a, shift unit 842b performs a circular shift of one sample on the transformed symbol $\{z'_1(n)\}$ for transmit antenna 234b, and so on, and shift unit 842t performs a circular shift of (T-1) samples on the transformed symbol $\{z'_{T-1}(n)\}$ for transmit antenna 234t. T cyclic prefix generators 636a through 636t receive T the circularly-shifted transformed symbols from shift units 842a through 842t, respectively. Each cyclic prefix generator 636 appends a C-sample cyclic prefix to its circularly-shifted transformed symbol $\{z'_i(n)\}$ and provides an OFDM symbol $\{x_i(n)\}$ containing (K+C) samples.

Figure 8B:
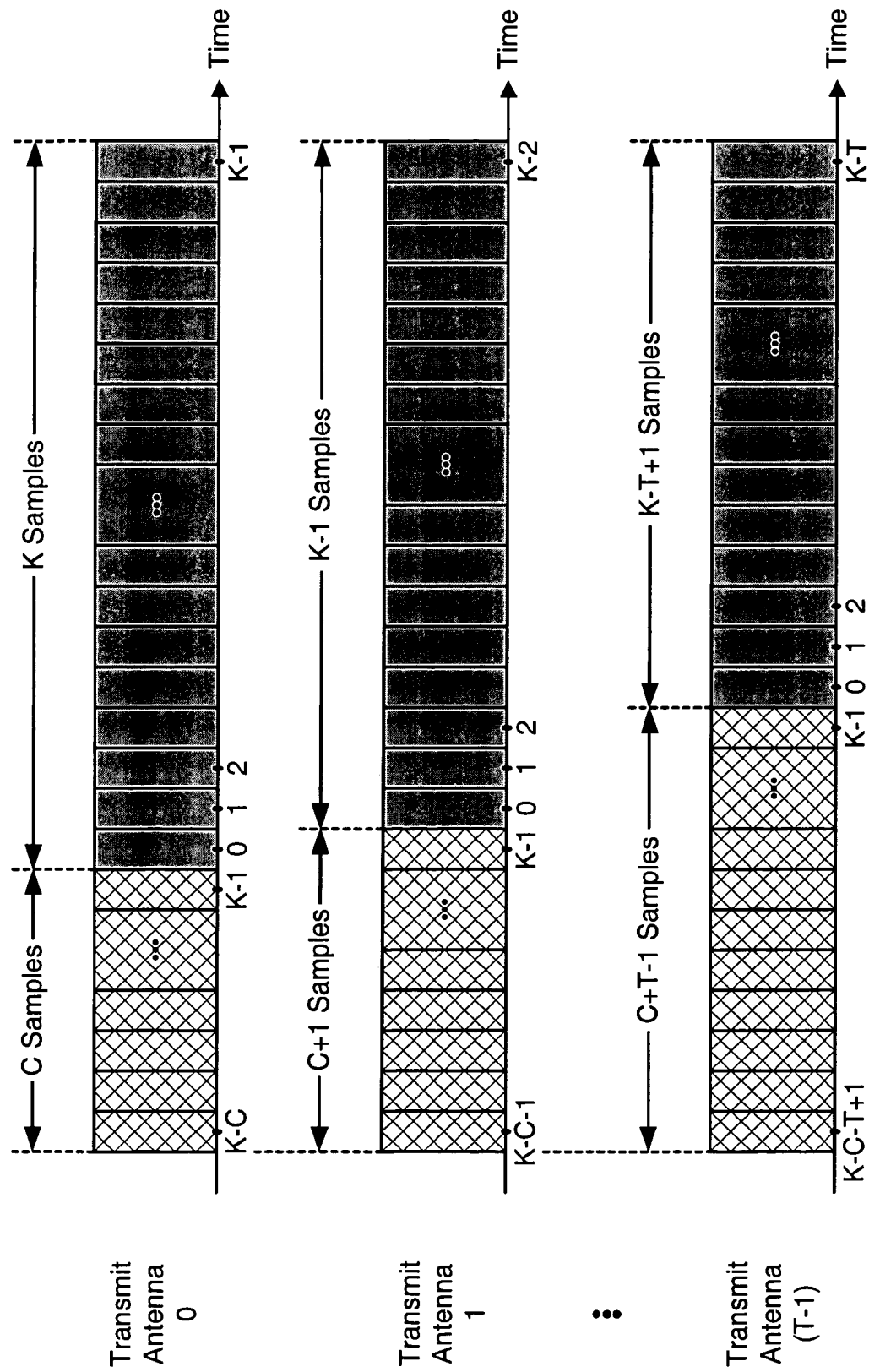
FIG. 8B shows transmissions with the beamformer in FIG. 8A.

FIG. 8B shows a timing diagram for the T transmissions from the T transmit antennas for the embodiment shown in FIG. 8A. T different transformed symbols are generated for the T transmit antennas from T different sets of spatially processed symbols, as shown in FIG. 8A. The T transformed symbols are then circularly shifted by different amounts for the T transmit antennas. A cyclic prefix is appended to each circularly-shifted transformed symbol in the normal manner. The T different OFDM symbols are sent from the T transmit antennas at the same time.

Figure 9A:
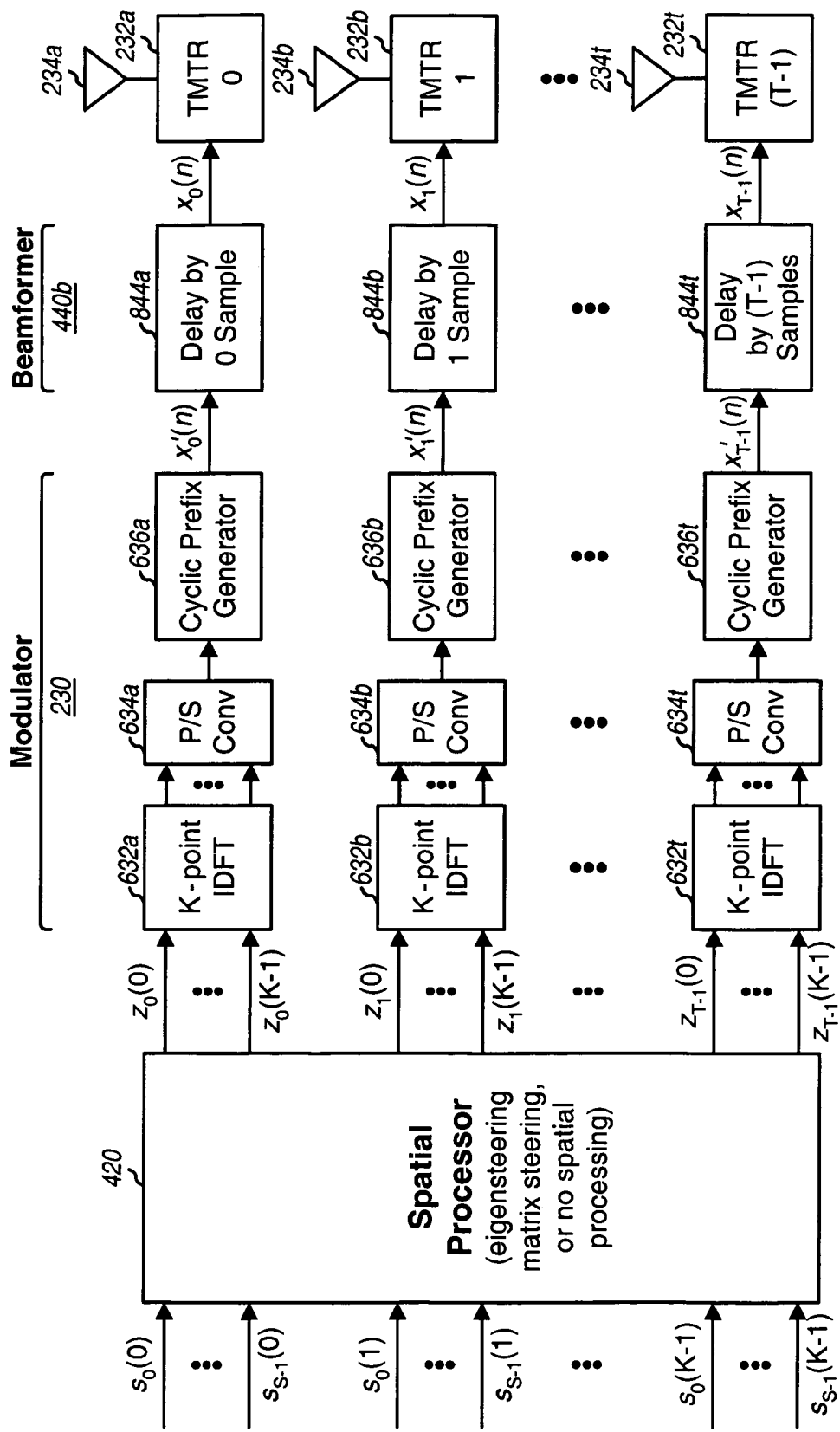
FIG. 9A shows a time-domain beamformer with linear delay.

FIG. 9A shows a block diagram of modulator 230 and a beamformer 440b, which is another embodiment of beamformer 440 in FIG. 7. Each OFDM modulator performs OFDM modulation on the spatially processed symbols for its transmit antenna and provides a stream of OFDM symbol $\{x'_i(n)\}$ for its transmit antenna. Beamformer 440b includes T digital delay units 844a through 844t for the T transmit antennas. Each delay unit 844 receives the OFDM symbol for its transmit antenna i from the associated OFDM modulator and delays the OFDM symbol by an amount determined by transmit antenna i. In particular, delay unit 844a for transmit antenna 234a delays its OFDM symbol $\{x'_0(n)\}$ by zero sample period, delay unit 844b for transmit antenna 234b delays its OFDM symbol $\{x'_1(n)\}$ by one sample period, and so on, and delay unit 844t for transmit antenna 234t delays its OFDM symbol $\{x'_{T-1}(n)\}$ by T-1 sample periods.

The T different delays may also be provided in the analog domain by transmitter units 232a through 232t. For example, transmitter unit 232a may delay its modulated signal by zero sample period, transmitter unit 232b may delay its modulated signal by one sample period (or $T_{sam}$ seconds), and so on, and transmitter unit 232t may delay its modulated signal by (T-1) sample periods (or $(T-1) \cdot T_{sam}$ seconds). A sample period is equal to $T_{sam}=1/[BW \cdot (K+C)]$, where BW is the overall bandwidth of the system in Hertz.

Figure 9B:
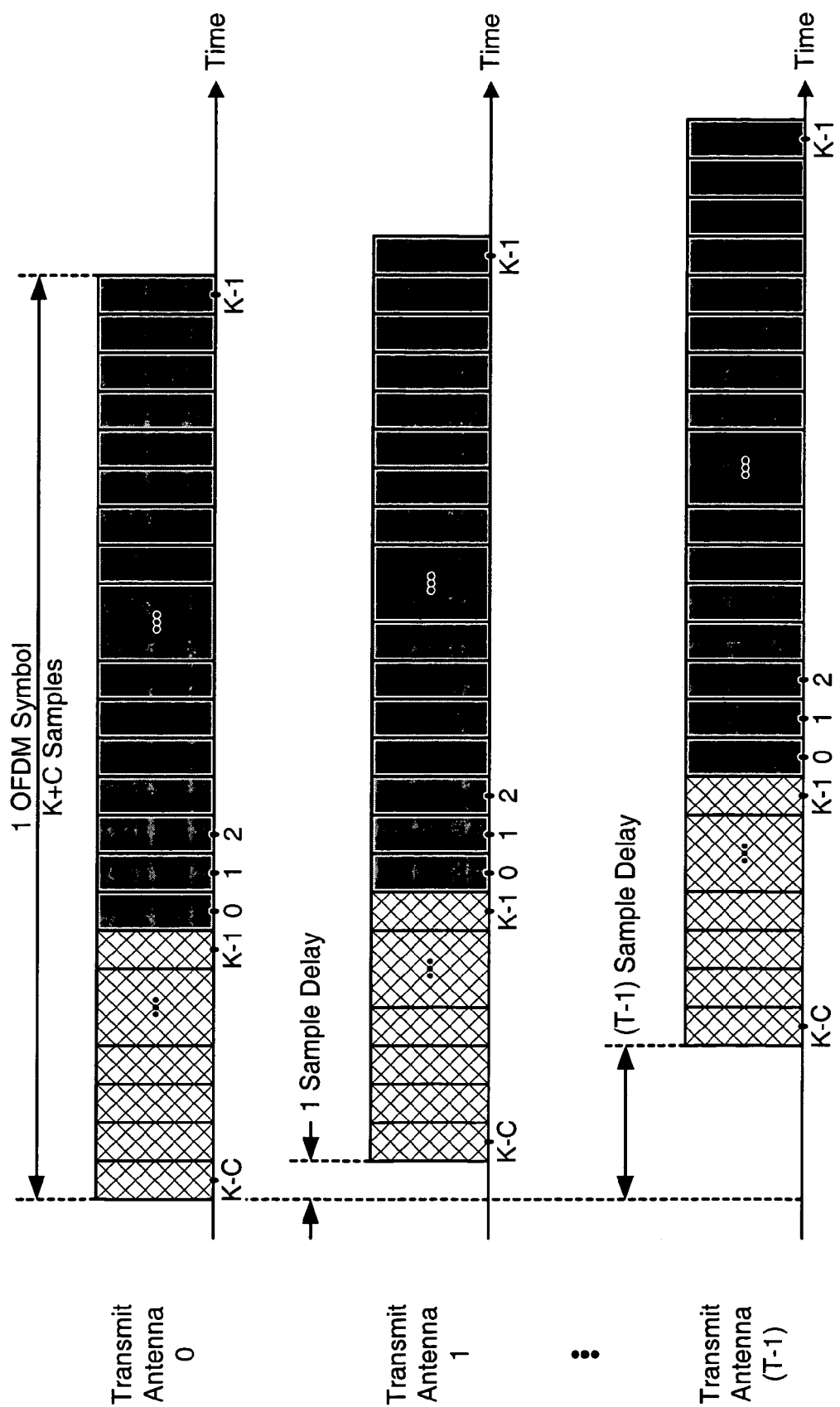
FIG. 9B shows transmissions with the beamformer in FIG. 9A.

FIG. 9B shows a timing diagram for the T transmissions from the T transmit antennas for the embodiments shown in FIG. 9A. T different transformed symbols are generated for the T transmit antennas, as shown in FIG. 9A. The OFDM symbol sent from each transmit antenna is delayed by a different amount.

For the embodiments shown in equations (12) through (14) and in FIGS. 8A and 9A, the delays for the T transmit antennas are in integer numbers of sample periods, or i sample periods for transmit antenna i. Other integer phase shifts, instead of i for transmit antenna i, may also be used for antenna i. Phase slopes that result in non-integer delays for the T transmit antennas (e.g., $g(i)=e^{-j\pi^{i/L}}$, for L>1) may also be implemented. For example, the time-domain samples from each P/S converter 634 in FIG. 8A may be up-sampled to a higher rate (e.g., with a period of $T_{upsam}=T_{sam}/L$). The higher rate samples may then be circularly shifted by the associated shift unit 842 by integer numbers of the higher rate sample period, $T_{upsam}$, where $T_{upsam}<T_{sam}$. Alternatively, each transmitter unit 232 may provide analog delays in integer numbers of $T_{upsam}$ (instead of $T_{sam}$). In general, any amounts of circular or linear delay may be used for the T transmit antennas. The delays for the T transmit antennas should be unique so that no two antennas have the same delay. In the frequency domain, this corresponds to a different phase characteristic for the beamformer across the K subbands.

When the number of transmit antennas is less than the cyclic prefix length (or T<C), the cyclic prefix appended to each OFDM symbol makes a linear delay by each delay units 844 appears like a circular rotation for the circular convolution with the time-domain impulse response $g_i(n)$. The weights as defined in equation (12) may thus be implemented by a time delay of i sample periods for each transmit antenna i, as shown in FIGS. 9A and 9B. However, as shown in FIG. 9B, the T OFDM symbols are transmitted from the T transmit antennas at different delays, which reduces the effectiveness of the cyclic prefix to protect against multipath delay.

Equations (11) and (12) represent a function that provides linearly changing phase shifts across the K subbands for each transmit antenna. The application of linearly changing phase shifts to symbols in the frequency domain may be achieved by either circularly shifting or delaying the corresponding time-domain samples, as described above. In general, the phase shifts across the K subbands for each transmit antenna may be changed in a continuous manner using any function so that the beams are varied in a continuous instead of abrupt manner across the subbands. A linear function of phase shifts is just one example of a continuous function. For a continuous function, an arbitrarily small change in the function input produces an arbitrarily small change in the function output. Some other exemplary continuous functions include a quadratic function, a cubic function, a parabolic function, and so on. The continuous change ensures that the performance of receiving entities that rely on some amounts of correlation across the subbands (e.g., to simplify channel estimation) is not degraded.

The embodiments shown in FIGS. 8A and 9A illustrate some of the ways in which beamforming may be performed in the time domain for continuous beamforming. In general, the beamforming may be performed in various manners and at various locations within the transmitting entity. The beamforming may be performed in the time-domain or the frequency-domain, using digital circuitry or analog circuitry, prior to or after the OFDM modulation, and so on.

The transmitting entity may selectively perform beamforming so that beamforming is either enabled or disabled. The decision to either apply or disable beamforming may be made based on various factors such as, for example, the channel condition. If the transmitting entity performs continuous beamforming, or if the receiving entity performs channel estimation without relying on correlation between subbands, then the receiving entity may not need to be aware of whether or not beamforming is being applied.

The transmitting entity may adaptively perform beamforming so that beamforming is adjusted in some manner over time. In one embodiment, the transmitting entity may enable or disable beamforming based on channel condition, feedback from the receiving entity, and/or some other factors. For example, the transmitting entity may apply beamforming if the channel is flat fading with unit magnitude complex channel gains that may add to zero or a low value for each subband at a receiving entity.

In another embodiment, the transmitting entity may adjust beamforming in a predetermined or pseudo-random manner. For time-domain beamforming, the amounts of delay for the T transmit antennas may be varied for each time interval, which may correspond to one symbol period, multiple symbol periods, the time duration between consecutive transmissions of a MIMO pilot (described below), and so on. For example, the transmitting entity may apply delays of $\{0, 1, 2, \ldots, T-1\}$ sample periods to the T transmit antennas in one time interval, then delays of $\{0, 0, 0, \ldots, 0\}$ sample periods to the T transmit antennas in the next time interval, then delays of $\{0, 2, 4, \ldots, 2(T-1)\}$ sample periods to the T transmit antennas in the following time interval, and so on. The transmitting entity may also cycle through the delays in a base set in different time intervals. For example, the transmitting entity may apply delays of $\{0, 1, 2, \ldots, T-1\}$ sample periods to the T transmit antennas in one time interval, then delays of $\{T-1, 0, 1, \ldots, T-2\}$ sample periods to the T transmit antennas in the next time interval, then delays of $\{T-2, T-1, 0, \ldots, T-3\}$ sample periods to the T transmit antennas in the following time interval, and so on. The transmitting entity may also apply delays in different orders in different time intervals. For example, the transmitting entity may apply delays of $\{0, 1, 2, \ldots, T-1\}$ sample periods to the T transmit antennas in one time interval, then delays of $\{2, 1, T-1, \ldots, 0\}$ sample periods to the T transmit antennas in the next time interval, then delays of $\{1, T-1, 0, \ldots, 2\}$ sample periods to the T transmit antennas in the following time interval, and so on. The transmitting entity may also apply fractional (e.g., 0.5, 1.5) sample periods of delay to any given transmit antenna.

If the receiving entity is unaware that beamforming is being performed, then the transmitting entity may perform beamforming in the same manner across all symbol periods in each data and pilot transmission interval (e.g., each frame). A data and pilot transmission interval is a time interval in which data as well as a pilot used to recover the data are transmitted. For example, the transmitting entity may use the same set of beamforming matrices B(k) for the K subbands or apply the same set of delays to the T transmit antennas for all symbol periods in each data and pilot transmission interval. This allows the receiving entity to estimate an "effective" MIMO channel response (with beamforming) based on a received MIMO pilot and to perform receiver spatial processing on received symbols for the data and pilot transmission interval with the effective MIMO channel response estimate, as described below.

If the receiving entity is aware of the beamforming being performed, then the transmitting entity may adjust the beamforming across the symbol periods in each data and pilot transmission interval. For example, the transmitting entity may use different sets of beamforming matrices B(k) or apply different sets of delays in different symbol periods. The receiving entity may estimate an initial effective MIMO channel response based on a received MIMO pilot, determine the effective MIMO channel response for each subsequent symbol period t based on the initial effective MIMO channel response estimate and knowledge of the beamforming being applied in symbol period t, and perform receiver spatial processing on received symbols for symbol period t with the effective MIMO channel response estimate for symbol period t.

3. Receiver Spatial Processing

For data transmission with eigensteering and beamforming, the receiving entity obtains R received symbols from the R receive antennas for each subband k, which may be expressed as:

$$\underline{r}_{bes}(k) = \underline{H}(k) \cdot \underline{B}(k) \cdot \underline{E}(k) \cdot \underline{s}(k) + \underline{n}(k), \quad \text{Eq (15)}$$
$$= \underline{H}_{eff}^{bes}(k) \cdot \underline{s}(k) + \underline{n}(k),$$

where $r_{bes}(k)$ is a vector with R received symbols for subband k;
n(k) is a noise vector for subband k; and
$H_{eff}^{bes}(k)$ is an "effective" channel response matrix observed by data vector s(k) with eigensteering and beamforming, which is:

$$H_{eff}^{bes}(k) = H(k) \cdot B(k) \cdot E(k). \quad \text{Eq (16)}$$

For simplicity, the noise is assumed to be additive white Gaussian noise (AWGN) with a zero mean vector and a covariance matrix of $\phi_{nn} = \sigma^2 \cdot I$, where $\sigma^2$ is the variance of the noise.

The receiving entity can recover the data symbols sent by the transmitting entity using various receiver processing techniques such as a minimum mean square error (MMSE) technique and a channel correlation matrix inversion (CCMI) technique (which is also commonly called a zero-forcing technique).

For the MMSE technique, the receiving entity may derive a spatial filter matrix $M_{mmse}^{bes}(k)$ for each subband k, as follows:

$$M_{mmse}^{bes}(k) = [H_{eff}^{bes\,H}(k) \cdot H_{eff}^{bes}(k) + \sigma^2 \cdot I]^{-1} \cdot H_{eff}^{bes\,H}(k). \quad \text{Eq (17)}$$

The spatial filter matrix $M_{mmse}^{bes}(k)$ minimizes the mean square error between the symbol estimates from the spatial filter and the data symbols in s(k).

The receiving entity may perform MMSE spatial processing for each subband k, as follows:

$$\hat{\underline{s}}_{mmse}^{bes}(k) = \underline{D}_{mmse}^{bes}(k) \cdot \underline{M}_{mmse}^{bes}(k) \cdot \underline{r}_{bes}(k), \quad \text{Eq (18)}$$
$$= \underline{D}_{mmse}^{bes}(k) \cdot \underline{M}_{mmse}^{bes}(k) \cdot [\underline{H}_{eff}^{bes}(k) \cdot \underline{s}(k) + \underline{n}(k)],$$
$$\approx \underline{s}(k) + \underline{n}_{mmse}^{bes}(k),$$

where $D_{mmse}^{bes}(k) = [\text{diag}[M_{mmse}^{bes}(k) \cdot H_{eff}^{bes}(k)]]^{-1}$; and
$n_{mmse}^{bes}(k)$ is the MMSE filtered noise.

The symbol estimates from the spatial filter $M_{mmse}^{bes}(k)$ are unnormalized estimates of the data symbols. The multiplication with the scaling matrix $D_{mmse}^{bes}(k)$ provides normalized estimates of the data symbols.

Eigensteering attempts to send data on the eigenmodes of H(k). However, a data transmission with eigensteering may not be completely orthogonal due to, for example, an imperfect estimate of H(k), error in the eigenvalue decomposition, finite arithmetic precision, and so on. The MMSE technique can account for (or "clean up") loss of orthogonality in the data transmission with eigensteering.

For the CCMI technique, the receiving entity may derive a spatial filter matrix $M_{ccmi}^{bes}(k)$ for each subband k, as follows:

$$M_{ccmi}^{bes}(k) = [H_{eff}^{bes\,H}(k) \cdot H_{eff}^{bes}(k)]^{-1} \cdot H_{eff}^{bes\,H}(k). \qquad \text{Eq (19)}$$

The receiving entity may perform CCMI spatial processing for each subband k, as follows:

$$\begin{aligned}\hat{s}_{ccmi}^{bes}(k) &= M_{ccmi}^{bes}(k) \cdot r_{bes}(k), \\ &= [H_{eff}^{bes\,H}(k) \cdot H_{eff}^{bes}(k)]^{-1} \cdot H_{eff}^{bes\,H}(k) \cdot \\ &\quad [H_{eff}^{bes}(k) \cdot s(k) + n(k)], \\ &= s(k) + n_{ccmi}^{bes}(k),\end{aligned} \qquad \text{Eq (20)}$$

where $n_{ccmi}^{bes}(k)$ is the CCMI filtered noise. The CCMI technique may amplify the noise due to the structure of $R_{eff}^{bes}(k) = H_{eff}^{bes\,H}(k) \cdot H_{eff}^{bes}(k)$.

The receiving entity may perform spatial processing for the other operating modes in similar manner, albeit with different effective channel response matrices and different spatial filter matrices. Table 1 summarizes the spatial processing at the transmitting entity for the various operating modes and the effective MIMO channel for each operating mode. For clarity, the index "(k)" for subband is not shown in Error! Reference source not found. Beamforming may be performed in the frequency domain, as shown Table 1. Linear continuous beamforming may also be performed in the time domain, as described above. In this case, the beamforming matrix B is omitted from the transmit symbol vector x but is still present in the effective MIMO channel response.

TABLE 1

|  |  | Transmitter | Effective Channel |
| --- | --- | --- | --- |
| No Beamforming | Eigensteering | $x_{es} = E \cdot s$ | $H_{eff}^{es} = H \cdot E$ |
|  | Matrix Steering | $x_{ss} = V \cdot s$ | $H_{eff}^{ss} = H \cdot V$ |
|  | No Spatial Processing | $x_{ns} = s$ | $H_{eff}^{ns} = H$ |
| Beamforming | Eigensteering | $x_{bes} = B \cdot E \cdot s$ | $H_{eff}^{bes} = H \cdot B \cdot E$ |
|  | Matrix Steering | $x_{bss} = B \cdot V \cdot s$ | $H_{eff}^{bss} = H \cdot B \cdot V$ |
|  | No Spatial Processing | $x_{bns} = B \cdot s$ | $H_{eff}^{bns} = H \cdot B$ |

In general, the receiving entity may derived an MMSE spatial filter matrix $M_{mmse}^{x}(k)$ for each subband k, as follows:

$$M_{mmse}^{x}(k) = [H_{eff}^{x\,H}(k) \cdot H_{eff}^{x}(k) + \sigma^2 I]^{-1} \cdot H_{eff}^{x\,H}(k), \qquad \text{Eq (21)}$$

where the superscript "x" denotes the operating mode and may be equal to "es" for eigensteering without beamforming, "ss" for matrix steering without beamforming, "ns" for no spatial processing and no beamforming, "bes" for eigensteering with beamforming, "bss" for matrix steering with beamforming, or "bns" for beamforming only. The MMSE spatial filter matrix $M_{mmse}^{x}(k)$ may be derived in the same manner for all operating modes, albeit with different effective channel response matrices $H_{eff}^{es}(k)$, $H_{eff}^{ss}(k)$, $H_{eff}^{ns}(k)$, $H_{eff}^{bes}(k)$, $H_{eff}^{bss}(k)$, and $H_{eff}^{bns}(k)$. The MMSE receiver spatial processing may also be performed in the same manner for all operating modes, albeit with the MMSE spatial filter matrices being derived with different effective channel response matrices. An MMSE-based receiver may thus support all operating modes using the same MMSE spatial processing. In equation (21), the term $\sigma^2 \cdot I$ may be replaced with the covariance matrix $\phi_{nn}$ of the noise, if known.

The receiving entity may also derived a CCMI spatial filter matrix $M_{ccmi}^{x}(k)$ for each subband k, as follows:

$$M_{ccmi}^{x}(k) = [H_{eff}^{x\,H}(k) \cdot H_{eff}^{x}(k)]^{-1} \cdot H_{eff}^{x\,H}(k). \qquad \text{Eq (22)}$$

Again, the receiving entity may derive the CCMI spatial filter matrix in the same manner for all operating modes, albeit with different effective channel response matrices. The receiving entity may also apply the CCMI spatial filter matrices in the same manner for all operating modes.

The receiving entity may utilize other receiver spatial processing techniques to recover the data symbols, and this is within the scope of the invention.

4. Pilot Transmission

The transmitting entity may transmit a pilot to allow the receiving entity to estimate the actual or effective MIMO channel response. The pilot may be transmitted in various manners. For example, the transmitting entity may transmit an unsteered MIMO pilot, a steered MIMO pilot, a spread MIMO pilot, and so on. A MIMO pilot is a pilot comprised of multiple pilot transmissions sent from the T transmit antennas. An unsteered MIMO pilot is comprised of up to T pilot transmissions sent from the T transmit antennas, one pilot transmission from each antenna. A steered MIMO pilot is comprised of up to S pilot transmissions sent on the S orthogonal spatial channels. A spread MIMO pilot is comprised of up to S pilot transmissions sent on the S spatial channels with matrix steering.

For a MIMO pilot, each of the multiple pilot transmissions is identifiable by the receiving entity. This may be achieved by:

1. Apply a different orthogonal sequence to each pilot transmission using code division multiplexing (CDM),
2. Send the multiple pilot transmissions in different symbol periods using time division multiplexing (TDM), and/or
3. Send the multiple pilot transmissions on different subbands using frequency division multiplexing (FDM).

For FDM, a different set of subbands may be used for each of the multiple pilot transmissions. The subbands used for each pilot transmission may be cycled such that the pilot transmission eventually observes all K subbands. A MIMO pilot may be sent with full transmit power for each transmit antenna using CDM or FDM, which is desirable. A MIMO pilot may also be sent using any combination of CDM, FDM, and TDM.

For an unsteered MIMO pilot, the transmitting entity may perform spatial processing for each subband k used for pilot transmission as follows:

$$z_{ns,mp}(k,t) = W(t) \cdot p(k), \qquad \text{Eq (23)}$$

where p(k) is a vector of pilot symbols to be sent on subband k;
W(t) is a diagonal Walsh matrix for symbol period t; and
$z_{ns,mp}(k)$ is a vector of spatially processed symbols for the unsteered MIMO pilot for subband k in symbol period t.

Different pilot symbols may be sent from the T transmit antennas, as shown in equation (23). Alternatively, the same pilot symbol may also be used for all transmit antennas, in which case the Walsh matrix is simply a Walsh vector.

If T=4, then the four transmit antennas may be assigned 4-symbol Walsh sequences $W_1$=1, 1, 1, 1, $W_2$=1, −1, 1, −1, $W_3$=1, 1, −1, −1, and $W_4$=1, −1, −1, 1 for the MIMO pilot. The four symbols of Walsh sequence $W_j$ are applied to the pilot transmission from transmit antenna j in four symbol periods. W(1) contains the first element of the four Walsh sequences along its diagonal, W(2) contains the second element of the four Walsh sequences, W(3) contains the third element of the four Walsh sequences, and W(4) contains the fourth element of the four Walsh sequences. The j-th Walsh sequence $W_j$ for transmit antenna j is thus carried as the j-th diagonal element of all the Walsh matrices. The four Walsh matrices may be used in four symbol periods to transmit the unsteered MIMO pilot.

The transmitting entity further processes the vector $z_{ns,mp}(k,t)$ for either beamforming or no beamforming, e.g., in the same manner as the data vector s(k), to obtain a transmit vector for the unsteered MIMO pilot. The transmitting entity may transmit the unsteered MIMO pilot over T symbol periods by using one Walsh matrix W(t) for each symbol period.

For an unsteered MIMO pilot without beamforming, the receiving entity obtains received pilot symbols for each subband k used for pilot transmission, as follows:

$$r_{ns,mp}(k,t)=H(k) \cdot W(t) \cdot p(k)+n(k). \qquad \text{Eq (24)}$$

The MIMO channel and noise is assumed to be static over the time during which the unsteered MIMO pilot is transmitted. The receiving entity obtains T vectors $r_{ns,mp}(k,1)$ through $r_{ns,mp}(k,T)$ for T-symbol Walsh sequences used for the unsteered MIMO pilot.

The receiving entity may estimate the actual MIMO channel response H(k) based on the received unsteered MIMO pilot without beamforming. Each column j of H(k) is associated with a respective Walsh sequence $W_j$. The receiving entity may obtain $h_{i,j}(k)$, which is the i-th element of the j-th column of H(k) by (1) multiplying the i-th element of $r_{ns,mp}(k,1)$ through $r_{ns,mp}(k,T)$ by the T chips of the Walsh sequence $W_j$, (2) removing the modulation used for pilot symbol $p_j(k)$, which is the j-th element of p(k), and (3) accumulating the T resultant elements to obtain $h_{i,j}(k)$. The process may be repeated for each element of H(k). The receiving entity may then use H(k) to derive the effective MIMO channel response $H_{\mathit{eff}}^{ss}(k)$ or $H_{\mathit{eff}}^{es}(k)$, which may be used for receiver spatial processing.

For an unsteered MIMO pilot with beamforming, the receiving entity obtains received pilot symbols for each subband k used for pilot transmission, as follows:

$$r_{bns,mp}(k,t)=H(k) \cdot B(k) \cdot W(t) \cdot p(k)+n(k). \qquad \text{Eq (25)}$$

The receiving entity may perform similar processing on the received unsteered MIMO pilot with beamforming to obtain $H_{\mathit{eff}}^{bns}(k)$ or $H_{\mathit{eff}}^{bss}(k)$.

For a steered MIMO pilot, the transmitting entity may perform spatial processing for each subband k used for pilot transmission as follows:

$$z_{es,mp}(k,t)=E(k) \cdot W(t) \cdot p(k), \qquad \text{Eq (26)}$$

where $z_{es,mp}(k,t)$ is a vector of spatially processed symbols for the steered MIMO pilot for subband k in symbol period t. For simplicity, E(k) is assumed to be static over the time during which the steered MIMO pilot is transmitted, and is thus not a function of symbol period t. The transmitter may further process the vector $z_{es,mp}(k,t)$ for either beamforming or no beamforming and may then transmit the steered MIMO pilot.

For a steered MIMO pilot without beamforming, the receiving entity obtains received pilot symbols for each subband k used for pilot transmission, as follows:

$$r_{es,mp}(k,t)=H(k) \cdot E(k) \cdot W(t) \cdot p(k)+n(k). \qquad \text{Eq (27)}$$

For a steered MIMO pilot with beamforming, the receiving entity obtains received pilot symbols for each subband k used for pilot transmission, as follows:

$$r_{bes,mp}(k,t)=H(k) \cdot B(k) \cdot E(k) \cdot W(t) \cdot p(k)+n(k). \qquad \text{Eq (28)}$$

The receiving entity may estimate $H_{\mathit{eff}}^{es}(k)$ based on $r_{es,mp}(k,n)$ and may estimate the $H_{\mathit{eff}}^{bes}(k)$ based on $r_{bes,mp}(k,n)$, in similar manner as described above for H(k).

For a spread MIMO pilot, the transmitting entity may perform spatial processing for each subband k used for pilot transmission as follows:

$$z_{ss,mp}(k,t)=V(k) \cdot W(t) \cdot p(k), \qquad \text{Eq (29)}$$

where $z_{ss,mp}(k,t)$ is a vector of spatially processed symbols for the spread MIMO pilot for subband k. The transmitter may further process the vector $z_{ss,mp}(k,t)$ for either beamforming or no beamforming, and may then transmit the resultant MIMO pilot.

The receiving entity may estimate $H_{\mathit{eff}}^{ss}(k)$ based on a received spread MIMO pilot without beamforming and may estimate $H_{\mathit{eff}}^{bss}(k)$ based on a received spread MIMO pilot with beamforming. The receiving entity may then derive the effective MIMO channel response $H_{\mathit{eff}}^{ns}(k)$ or $H_{\mathit{eff}}^{bns}(k)$, which may be used for receiver spatial processing.

5. Steering Matrix

A set of steering matrices may be generated and used for matrix steering. These steering matrices may be denoted as {V}, or V(i) for i=1 ... L, where L may be any integer greater than one. Each steering matrix V(i) should be a unitary matrix. This condition ensures that the T data symbols transmitted simultaneously using V(i) have the same power and are orthogonal to one another after the matrix steering with V(i).

The set of L steering matrices may be generated in various manners. For example, the L steering matrices may be generated based on a unitary base matrix and a set of scalars. The base matrix may be used as one of the L steering matrices. The other L-1 steering matrices may be generated by multiplying the rows of the base matrix with different combinations of scalars. Each scalar may be any real or complex value. The scalars are selected to have unit magnitude so that steering matrices generated with these scalars are unitary matrices.

The base matrix may be a Walsh matrix. A 2×2 Walsh matrix $W_{2 \times 2}$ and a larger size Walsh matrix $W_{2N \times 2N}$ may be expressed as:

$$\underline{W}_{2 \times 2} = \begin{bmatrix} 1 & 1 \\ 1 & -1 \end{bmatrix} \text{ and } \underline{W}_{2N \times 2N} = \begin{bmatrix} \underline{W}_{N \times N} & \underline{W}_{N \times N} \\ \underline{W}_{N \times N} & -\underline{W}_{N \times N} \end{bmatrix}. \qquad \text{Eq (30)}$$

Walsh matrices have dimensions that are powers of two (e.g., 2, 4, 8, and so on).

The base matrix may also be a Fourier matrix. For an N×N Fourier matrix $D_{N \times N}$, the elements $d_{n,m}$ of $D_{N \times N}$ may be expressed as:

$$d_{n,m} = e^{-j2\pi \frac{n \cdot m}{N}}, \qquad \text{Eq. (31)}$$

for $n = 0, \ldots, N-1$ and $m = 0, \ldots, N-1$.

Fourier matrices of any square dimension (e.g., 2, 3, 4, 5, and so on) may be formed. Other matrices may also be used as the base matrix.

For an N×N base matrix, each of rows 2 through N of the base matrix may be independently multiplied with one of Q different possible scalars. $Q^{N-1}$ different steering matrices may be obtained from $Q^{N-1}$ different permutations of the Q scalars for N−1 rows. For example, each of rows 2 through N may be independently multiplied with a scalar of +1, −1, +j, or −j, where $j=\sqrt{-1}$. In general, each row of the base matrix may be multiplied with any scalar having the form $e^{j\theta}$, where θ may be any phase value. Each element of a scalar-multiplied N×N base matrix is further scaled by $1/\sqrt{N}$ to obtain an N×N steering matrix having unit power for each column.

Steering matrices derived based on a Walsh matrix (or a 4×4 Fourier matrix) have certain desirable properties. If the rows of the Walsh matrix are multiplied with scalars of ±1 and ±j, then each element of a resultant steering matrix V(i) belongs in a set composed of {+1, −1, +j, −j}. In this case, the multiplication of an element of another matrix with an element of V(i) may be performed with just bit manipulation.

The data transmission techniques described herein may be used for various wireless systems. These techniques may also be used for the downlink (or forward link) as well as the uplink (or reverse link).

Continuous beamforming with or without matrix steering may be used in various manners. For example, a transmitting entity (e.g., an access point or a user terminal) may use continuous beamforming to transmit to a receiving entity (e.g., another access point or user terminal) when accurate information about the wireless channel is not available. Accurate channel information may not be available due to various reasons such as, for example, a feedback channel that is corrupted, a system that is poorly calibrated, the channel conditions changing too rapidly for the transmitting entity to use/adjust beam steering on time (e.g., due to the transmitting and/or receiving entity moving at a high velocity), and so on.

Continuous beamforming may also be used for various applications in a wireless system. In one application, broadcast channels in the system may be transmitted using continuous beamforming, as described above. The use of continuous beamforming allows wireless devices in the system to receive the broadcast channels with improved reliability, thereby increasing the range of the broadcast channels. In another application, a paging channel is transmitted using continuous beamforming. Again, improved reliability and/or greater coverage may be achieved for the paging channel via the use of continuous beamforming. In yet another application, an 802.11a access point uses continuous beamforming to improve the performance of user terminals under its coverage area.

The transmission techniques described herein may be implemented by various means. For example, these techniques may be implemented in hardware, software, or a combination thereof. For a hardware implementation, the processing units at a transmitting entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a receiving entity may also be implemented with one or more ASICs, DSPs, and so on.

For a software implementation, some of the processing may be implemented with modules (e.g., procedures, functions, and so on) that perform the functions described herein. The software codes may be stored in a memory unit (e.g., memory unit 242 or 282 in FIG. 2) and executed by a processor (e.g., controller 240 or 280). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data in a multiple-input multiple-output (MIMO) communication system, comprising:
   performing spatial processing on data symbols for each of a plurality of frequency subbands to obtain spatially processed symbols for the frequency subband; and
   performing beamforming on the spatially processed symbols for the plurality of frequency subbands prior to transmission from a plurality of antennas.

2. The method of claim 1, wherein the performing spatial processing on the data symbols comprises
   spatially processing the data symbols for each frequency subband with an eigenmode matrix to transmit the data symbols on orthogonal spatial channels of the frequency subband.

3. The method of claim 1, wherein the performing spatial processing on the data symbols comprises
   spatially processing the data symbols for each frequency subband with a steering matrix to transmit each of the data symbols on a plurality of spatial channels of the frequency subband.

4. The method of claim 1, wherein the performing spatial processing on the data symbols comprises
   spatially processing the data symbols for each frequency subband with an identity matrix.

5. The method of claim 1, wherein the performing beamforming on the spatially processed symbols comprises
   performing beamforming in the frequency domain by multiplying the spatially processed symbols for each frequency subband with a beamforming matrix for the frequency subband.

6. The method of claim 1, wherein the performing beamforming on the spatially processed symbols comprises
   performing beamforming in the time domain by applying different amounts of delay for the plurality of antennas.

7. The method of claim 1, further comprising:
   processing the spatially processed symbols for the plurality of frequency subbands for each antenna to obtain a sequence of time-domain samples for the antenna, and
   circularly shifting the sequence of time-domain samples for each antenna by an amount of delay selected for the antenna to achieve the beamforming.

8. The method of claim 7, wherein a plurality of sequences of time-domain samples are obtained for the plurality of antennas, and wherein the plurality of sequences of time-domain samples are circularly shifted by different amounts.

9. The method of claim 1, further comprising:
   performing an inverse discrete Fourier transform on spatially processed symbols for the plurality of frequency subbands for each antenna to obtain a first sequence of time-domain samples for the antenna, circularly shifting the first sequence of time-domain samples for each antenna by an amount selected for the antenna to obtain a second sequence of time-domain samples for the antenna, wherein the beamforming is performed by the circular shifting of the first sequence for each antenna, and repeating a portion of the second sequence of time-domain samples for each antenna to obtain an output sequence of time-domain samples for the antenna.

10. The method of claim 1, further comprising:
transmitting a plurality of sequences of time-domain samples from the plurality of antennas aligned in time.

11. The method of claim 1, further comprising:
processing the spatially processed symbols for the plurality of frequency subbands for each antenna to obtain a sequence of time-domain samples for the antenna, and linearly delaying the sequence of time-domain samples for each antenna by an amount of delay selected for the antenna to achieve the beamforming.

12. The method of claim 1, farther comprising:
performing an inverse discrete Fourier transform on spatially processed symbols for the plurality of frequency subbands for each antenna to obtain a first sequence of time-domain samples for the antenna, repeating a portion of the first sequence of time-domain samples for each antenna to obtain a second sequence of time-domain samples for the antenna, and delaying the second sequence of time-domain samples for each antenna by an amount of delay selected for the antenna, wherein the beamforming is performed by delaying the second sequence for each antenna.

13. The method of claim 1, farther comprising:
transmitting a plurality of sequences of time-domain samples from the plurality of antennas staffing at different times.

14. The method of claim 1, farther comprising:
applying linearly varying phase shifts across the plurality of frequency subbands for each antenna.

15. The method of claim 1, farther comprising:
applying a different phase slope across the plurality of frequency subbands for each antenna.

16. The method of claim 1, farther comprising:
applying continuously varying phase shifts across the plurality of frequency subbands for each antenna.

17. The method of claim 16, further comprising:
determining the continuously varying phase shifts across the plurality of frequency subbands for each antenna based on a function selected for the antenna.

18. The method of claim 1, wherein the beamforming is adaptively performed and varies over time.

19. The method of claim 5, further comprising:
selecting different sets of beamforming matrices for the plurality of frequency subbands in different time intervals.

20. The method of claim 6, further comprising:
selecting different sets of delays for the plurality of antennas in different time intervals, each set of delays indicating the amount of delay for each of the plurality of antennas.

21. The method of claim 20, further comprising:
selecting the delays for each different set based on delays in a predetermined set.

22. The method of claim 1, further comprising:
varying the beamforming over each time interval.

23. The method of claim 22, wherein each time interval corresponds to a time duration with a pilot transmission suitable for channel estimation.

24. The method of claim 22, wherein each time interval corresponds to a predetermined number of symbol periods.

25. An apparatus in a multiple-input multiple-output (MIMO) communication system, comprising:
a spatial processor to perform spatial processing on data symbols for each of a plurality of frequency subbands and provide spatially processed symbols for the frequency subband; and a beamformer to perform beamforming on the spatially processed symbols for the plurality of frequency subbands prior to transmission from a plurality of antennas.

26. The apparatus of claim 25, wherein the spatial processor spatially processes the data symbols for each frequency subband with an eigenmode matrix to transmit the data symbols on orthogonal spatial channels of the frequency subband.

27. The apparatus of claim 25, wherein the spatial processor spatially processes the data symbols for each frequency subband with a steering matrix to transmit each of the data symbols on a plurality of spatial channels of the frequency subband.

28. The apparatus of claim 25, wherein the spatial processor spatially processes the data symbols for each frequency subband with an identity matrix.

29. The apparatus of claim 25, wherein the beamformer performs beamforming in the frequency domain by multiplying the spatially processed symbols for each frequency subband with a beamforming matrix for the frequency subband.

30. The apparatus of claim 25, wherein the beamformer performs beamforming in the time domain by applying different amounts of delay for the plurality of antennas.

31. The apparatus of claim 25, further comprising:
a modulator to transform the spatially processed symbols for the plurality of frequency subbands for each antenna to obtain a sequence of time-domain samples for the antenna, and wherein the beamformer delays the sequence of time-domain samples for each antenna by an amount of delay selected for the antenna to achieve the beamforming.

32. The apparatus of claim 31, wherein the modulator provides a plurality of sequences of time-domain samples for the plurality of antennas, and wherein the beamformer delays the plurality of sequences of time-domain samples by different amounts of delay.

33. An apparatus in a multiple-input multiple-output (MIMO) communication system, comprising:
means for performing spatial processing on data symbols for each of a plurality of frequency subbands to obtain spatially processed symbols for the frequency subband; and means for performing beamforming on the spatially processed symbols for the plurality of frequency subbands prior to transmission from a plurality of antennas.

34. The apparatus of claim 33, wherein the means for performing spatial processing on the data symbols comprises means for spatially processing the data symbols for each frequency subband with an eigenmode matrix to transmit the data symbols on orthogonal spatial channels of the frequency subband.

35. The apparatus of claim 33, wherein the means for performing spatial processing on the data symbols comprises means for spatially processing the data symbols for each frequency subband with a steering matrix to transmit each of the data symbols on a plurality of spatial channels of the frequency subband.

36. The apparatus of claim 33, wherein the means for performing spatial processing on the data symbols comprises
means for spatially processing the data symbols for each frequency subband with an identity matrix.

37. The apparatus of claim 33, wherein the means for performing beamforming on the spatially processed symbols comprises
means for performing beamforming in the frequency domain by multiplying the spatially processed symbols for each frequency subband with a beamforming matrix for the frequency subband.

38. The apparatus of claim 33, wherein the means for performing beamforming on the spatially processed symbols comprises
means for performing beamforming in the time domain by applying different amounts of delay for the plurality of antennas.

39. The apparatus of claim 33, further comprising:
means for transforming the spatially processed symbols for the plurality of frequency subbands for each antenna to obtain a sequence of time-domain samples for the antenna, and
means for delaying the sequence of time-domain samples for each antenna by an amount of delay selected for the antenna to achieve the beamforming.

40. The apparatus of claim 39, wherein a plurality of sequences of time-domain samples are obtained for the plurality of antennas, and wherein the plurality of sequences of time-domain samples are delayed by different amounts of delay.

41. A method of receiving data in a multiple-input multiple-output (MIMO) communication system, comprising:
deriving a spatial filter matrix for each of a plurality of frequency subbands, the spatial filter matrix for each frequency subband including effects of spatial processing and beamforming performed on data symbols sent on the frequency subband; and
performing spatial processing on received symbols obtained from a plurality of antennas for each subband with the spatial filter matrix for the subband to obtain detected data symbols for the subband.

42. The method of claim 41, further comprising:
obtaining a channel response estimate for each of at least one frequency subband based on a pilot received via the plurality of antennas, wherein a plurality of spatial filter matrices are derived for the plurality of frequency subbands based on the channel response estimate obtained for the at least one frequency subband.

43. The method of claim 41, wherein the deriving the spatial filter matrix for each frequency subband comprises
deriving the spatial filter matrix for each subband based on a minimum mean square error (MMSE) technique.

44. The method of claim 41, wherein the deriving the spatial filter matrix for each frequency subband comprises
deriving the spatial filter matrix for each subband based on a channel correlation matrix inversion (CCMI) technique.

45. An apparatus in a multiple-input multiple-output (MIMO) communication system, comprising:
a controller to derive a spatial filter matrix for each of a plurality of frequency subbands, the spatial filter matrix for each frequency subband including effects of spatial processing and beamforming performed on data symbols sent on the frequency subband; and
a spatial processor to perform spatial processing on received symbols obtained from a plurality of antennas for each subband with the spatial filter matrix for the subband to obtain detected data symbols for the subband.

46. The apparatus of claim 45, further comprising:
a channel estimator to obtain a channel response estimate for each of at least one frequency subband based on a pilot received via the plurality of antennas, and wherein the controller derives a plurality of spatial filter matrices for the plurality of frequency subbands based on the channel response estimate obtained for the at least one frequency subband.

47. An apparatus in a multiple-input multiple-output (MIMO) communication system, comprising:
means for deriving a spatial filter matrix for each of a plurality of frequency subbands, the spatial filter matrix for each frequency subband including effects of spatial processing and beamforming performed on data symbols sent on the frequency subband; and
means for performing spatial processing on received symbols obtained from a plurality of antennas for each subband with the spatial filter matrix for the subband to obtain detected data symbols for the subband.

48. The apparatus of claim 47, further comprising:
means for obtaining a channel response estimate for each of at least one frequency subband based on a pilot received via the plurality of antennas, wherein a plurality of spatial filter matrices are derived for the plurality of frequency subbands based on the channel response estimate obtained for the at least one frequency subband.

49. A memory unit having software codes stored thereon, the software codes executable by a processor for performing a method, the software codes comprising:
software codes for performing spatial processing on data symbols for each of a plurality of frequency subbands to obtain spatially processed symbols for the frequency subband; and
software codes for performing beamforming on the spatially processed symbols for the plurality of frequency subbands prior to transmission from a plurality of antennas.

50. The memory unit of claim 49, the software codes further comprising:
software codes for processing the spatially processed symbols for the plurality of frequency subbands for each antenna to obtain a sequence of time-domain samples for the antenna, and
software codes for circularly shifting the sequence of time-domain samples for each antenna by an amount of delay selected for the antenna to achieve the beamforming.

51. The memory unit of claim 49, the software codes further comprising:
software codes for performing an inverse discrete Fourier transform on spatially processed symbols for the plurality of frequency subbands for each antenna to obtain a first sequence of time-domain samples for the antenna,
software codes for circularly shifting the first sequence of time-domain samples for each antenna by an amount selected for the antenna to obtain a second sequence of time-domain samples for the antenna, wherein the beamforming is performed by the circular shifting of the first sequence for each antenna, and
software codes for repeating a portion of the second sequence of time-domain samples for each antenna to obtain an output sequence of time-domain samples for the antenna.

52. The memory unit of claim 49, the software codes further comprising:

software codes for transmitting a plurality of sequences of time-domain samples from the plurality of antennas aligned in time.

53. The memory unit of claim 49, the software codes further comprising:
software codes for processing the spatially processed symbols for the plurality of frequency subbands for each antenna to obtain a sequence of time-domain samples for the antenna, and
software codes for linearly delaying the sequence of time-domain samples for each antenna by an amount of delay selected for the antenna to achieve the beamforming.

54. The memory unit of claim 49, the software codes further comprising:
software codes for performing an inverse discrete Fourier transform on spatially processed symbols for the plurality of frequency subbands for each antenna to obtain a first sequence of time-domain samples for the antenna,
software codes for repeating a portion of the first sequence of time-domain samples for each antenna to obtain a second sequence of time-domain samples for the antenna, and
software codes for delaying the second sequence of time-domain samples for each antenna by an amount of delay selected for the antenna, wherein the beamforming is performed by delaying the second sequence for each antenna.

55. The memory unit of claim 49, the software codes further comprising:
software codes for transmitting a plurality of sequences of time-domain samples from the plurality of antennas starting at different times.

56. The memory unit of claim 49, the software codes further comprising:
software codes for applying linearly varying phase shifts across the plurality of frequency subbands for each antenna.

57. The memory unit of claim 49, the software codes further comprising:
software codes for applying a different phase slope across the plurality of frequency subbands for each antenna.

58. The memory unit of claim 49, the software codes further comprising:
software codes for applying continuously varying phase shifts across the plurality of frequency subbands for each antenna.

59. The memory unit of claim 49, the software codes further comprising:
software codes for determining the continuously varying phase shifts across the plurality of frequency subbands for each antenna based on a function selected for the antenna.

60. The memory unit of claim 49, the software codes further comprising:
software codes for varying the beamforming over each time interval.

61. A processor configured to execute instructions, the instructions comprising:
instructions to perform spatial processing on data symbols for each of a plurality of frequency subbands to obtain spatially processed symbols for the frequency subband; and
instructions to perform beamforming on the spatially processed symbols for the plurality of frequency subbands prior to transmission from a plurality of antennas.

62. The processor of claim 61, the instructions further comprising:
instructions to process the spatially processed symbols for the plurality of frequency subbands for each antenna to obtain a sequence of time-domain samples for the antenna, and
instructions to circularly shift the sequence of time-domain samples for each antenna by an amount of delay selected for the antenna to achieve the beamforming.

63. The processor of claim 61, the instructions further comprising:
instructions to perform an inverse discrete Fourier transform on spatially processed symbols for the plurality of frequency subbands for each antenna to obtain a first sequence of time-domain samples for the antenna,
instructions to circularly shift the first sequence of time-domain samples for each antenna by an amount selected for the antenna to obtain a second sequence of time-domain samples for the antenna, wherein the beamforming is performed by the circular shifting of the first sequence for each antenna, and
instructions to repeat a portion of the second sequence of time-domain samples for each antenna to obtain an output sequence of time-domain samples for the antenna.

64. The processor of claim 61, the instructions further comprising:
instructions to transmit a plurality of sequences of time-domain samples from the plurality of antennas aligned in time.

65. The processor of claim 61, the instructions further comprising:
instructions to process the spatially processed symbols for the plurality of frequency subbands for each antenna to obtain a sequence of time-domain samples for the antenna, and
instructions to linearly delay the sequence of time-domain samples for each antenna by an amount of delay selected for the antenna to achieve the beamforming.

66. The processor of claim 61, the instructions further comprising:
instructions to perform an inverse discrete Fourier transform on spatially processed symbols for the plurality of frequency subbands for each antenna to obtain a first sequence of time-domain samples for the antenna,
instructions to repeat a portion of the first sequence of time-domain samples for each antenna to obtain a second sequence of time-domain samples for the antenna, and
instructions to delay the second sequence of time-domain samples for each antenna by an amount of delay selected for the antenna, wherein the beamforming is performed by delaying the second sequence for each antenna.

67. The processor of claim 61, the instructions further comprising:
instructions to transmit a plurality of sequences of time-domain samples from the plurality of antennas starting at different times.

68. The processor of claim 61, the instructions further comprising:
instructions to apply linearly varying phase shifts across the plurality of frequency subbands for each antenna.

69. The processor of claim 61, the instructions further comprising:
instructions to apply a different phase slope across the plurality of frequency subbands for each antenna.

70. The processor of claim 61, the instructions further comprising:

instructions to apply continuously varying phase shifts across the plurality of frequency subbands for each antenna.

71. The processor of claim 61, the instructions further comprising:
instructions to determine the continuously varying phase shifts across the plurality of frequency subbands for each antenna based on a function selected for the antenna.

72. The processor of claim 61, the instructions further comprising:
instructions to vary the beamforming over each time interval.

\* \* \* \* \*